（12） United States Patent
Foskey

(10) Patent No.: US 10,077,106 B2
(45) Date of Patent: Sep. 18, 2018

(54) STORAGE MODES FOR TILTROTOR AIRCRAFT

(71) Applicant: Bell Helicopter Textron Inc., Fort Worth, TX (US)

(72) Inventor: Christopher Edward Foskey, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 246 days.

(21) Appl. No.: 15/269,835

(22) Filed: Sep. 19, 2016

(65) Prior Publication Data

US 2018/0079501 A1    Mar. 22, 2018

(51) Int. Cl.
*B64C 27/22*    (2006.01)
*B64C 29/00*    (2006.01)
*B64C 11/28*    (2006.01)
*B64C 3/56*    (2006.01)
*B64C 5/10*    (2006.01)
(Continued)

(52) U.S. Cl.
CPC ............ *B64C 29/0033* (2013.01); *B64C 3/56* (2013.01); *B64C 5/02* (2013.01); *B64C 5/10* (2013.01); *B64C 7/02* (2013.01); *B64C 11/28* (2013.01)

(58) Field of Classification Search
CPC .. B64C 11/28; B64C 5/02; B64C 5/10; B64C 29/0033; B64C 7/02; B64C 3/56
See application file for complete search history.

(56) References Cited

U.S. PATENT DOCUMENTS 3,515,500 A * 6/1970 Nachod ............... B64C 29/0033
244/12.3
3,592,412 A * 7/1971 Glatfelter ............ B64C 29/0033
244/7 A
(Continued)

FOREIGN PATENT DOCUMENTS

FR            2098390 A1    3/1972
WO     2011159281 A1    12/2011

OTHER PUBLICATIONS

European Examination Report, Application No. 16201821.2, dated Aug. 17, 2017.
(Continued)

*Primary Examiner* — Timothy D Collins
*Assistant Examiner* — Tye William Abell
(74) *Attorney, Agent, or Firm* — Lawrence Youst PLLC

(57) ABSTRACT

A tiltrotor aircraft having a VTOL flight mode, a forward flight mode and a storage mode includes a fuselage having a wing rotatably mounted thereto. The wing has an orientation generally perpendicular to the fuselage, in the flight modes, and an orientation generally parallel to the fuselage, in the storage mode. First and second pylon assemblies are positioned proximate outboard ends of the wing. First and second mast assemblies are respectively rotatable relative to the first and second pylon assemblies and have generally vertical orientations, in the VTOL flight mode, and generally horizontal orientations, in the forward flight mode and the storage mode. First and second proprotor assemblies are respectively rotatable relative to the first and second mast assemblies. Each proprotor assembly includes a plurality of rotor blades and has a radially extended orientation, in the flight modes, and a stowed orientation, in the storage mode.

19 Claims, 21 Drawing Sheets

(51) Int. Cl.
 *B64C 5/02* (2006.01)
 *B64C 7/02* (2006.01)

(56) References Cited

U.S. PATENT DOCUMENTS

| | | | | |
|---|---|---|---|---|
| 4,354,646 A * | 10/1982 | Raymer | ................... | B64C 5/10 |
| | | | | 244/47 |
| 4,691,878 A * | 9/1987 | Vaughan | ................... | B64C 3/56 |
| | | | | 244/49 |
| 5,031,858 A | 7/1991 | Schellhase et al. | | |
| 5,211,538 A | 5/1993 | Seghal et al. | | |
| 5,337,974 A * | 8/1994 | Rumberger | ............... | B64C 3/40 |
| | | | | 244/39 |
| 5,868,351 A * | 2/1999 | Stamps | ................... | B64C 27/50 |
| | | | | 244/12.4 |
| 6,276,633 B1 * | 8/2001 | Balayn | ................... | B64C 27/12 |
| | | | | 244/56 |
| 6,367,736 B1 * | 4/2002 | Pancotti | ............. | B64C 29/0033 |
| | | | | 244/48 |
| 8,998,125 B2 | 4/2015 | Hollimon et al. | | |
| 9,156,545 B1 | 10/2015 | Fenny et al. | | |
| 2010/0072325 A1 | 3/2010 | Sambell | | |
| 2010/0327123 A1 * | 12/2010 | Smith | ................... | B64C 27/26 |
| | | | | 244/7 C |
| 2014/0263854 A1 * | 9/2014 | Ross | ................... | B64C 29/0033 |
| | | | | 244/7 A |
| 2015/0048213 A1 * | 2/2015 | Ross | ................... | B64C 29/0033 |
| | | | | 244/7 A |
| 2015/0274290 A1 * | 10/2015 | Fenny | ................... | B64C 27/50 |
| | | | | 244/17.25 |
| 2015/0375860 A1 * | 12/2015 | Hong | ................... | B64D 35/00 |
| | | | | 244/12.4 |
| 2016/0244147 A1 * | 8/2016 | Arata | ....................... | B64C 9/24 |
| 2016/0311553 A1 * | 10/2016 | Alber | ................... | B64D 39/04 |
| 2017/0144746 A1 * | 5/2017 | Schank | ................... | B64C 11/28 |
| 2017/0158323 A1 * | 6/2017 | Ross | ................... | B64C 29/0033 |
| 2017/0197712 A1 * | 7/2017 | Alber | ................... | B64C 29/0033 |
| 2017/0297698 A1 * | 10/2017 | Alber | ................... | B64C 29/0033 |
| 2017/0327205 A1 * | 11/2017 | Paulson | ................... | B64C 11/28 |

OTHER PUBLICATIONS

European Search Report, Application No. 16201821.2, dated Jul. 17, 2017.

* cited by examiner

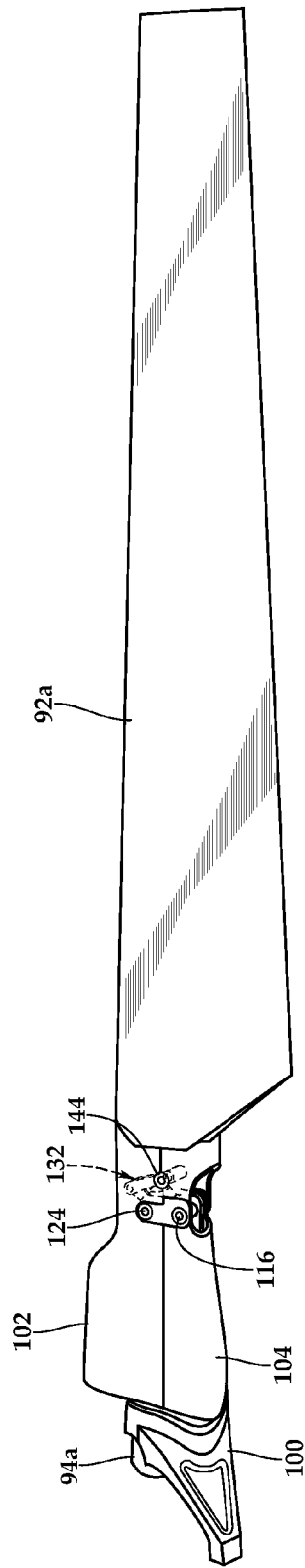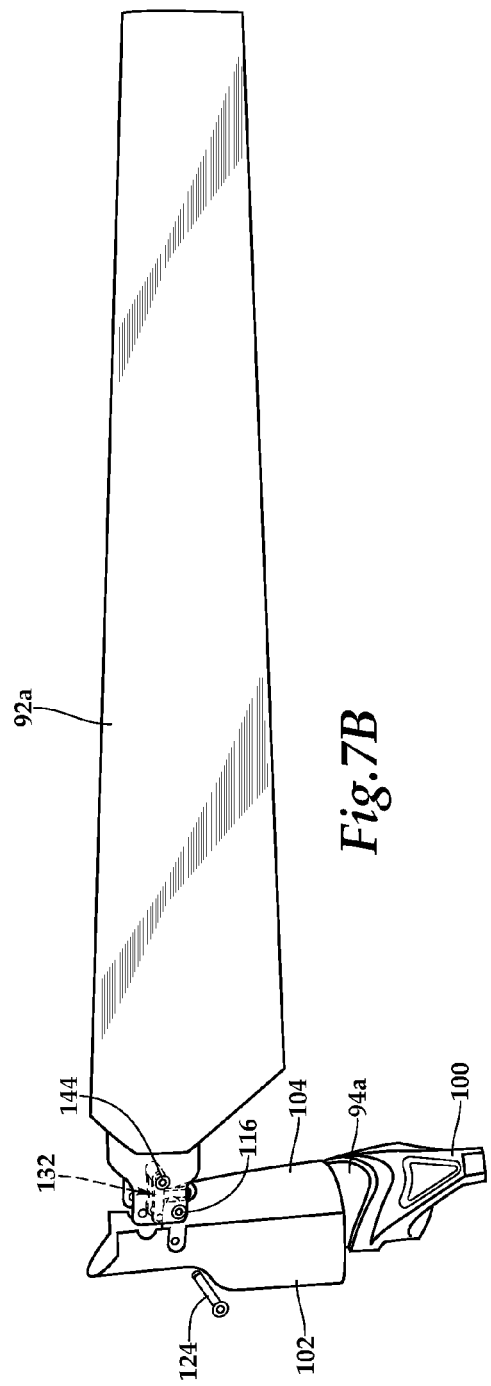

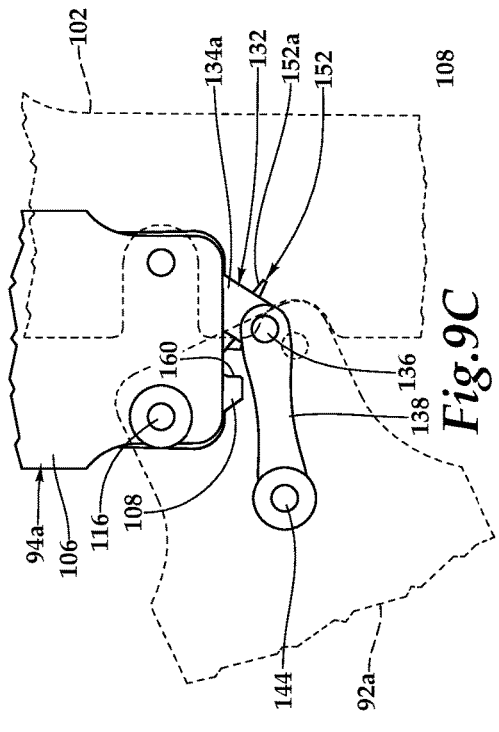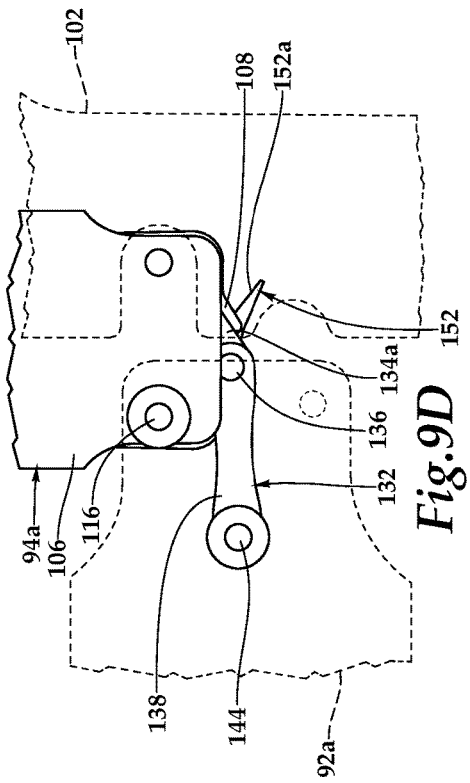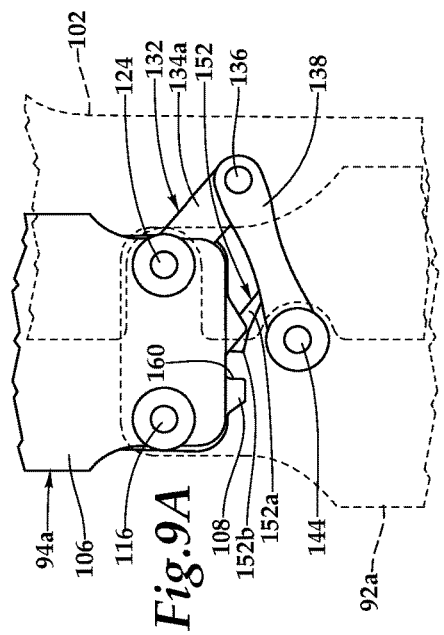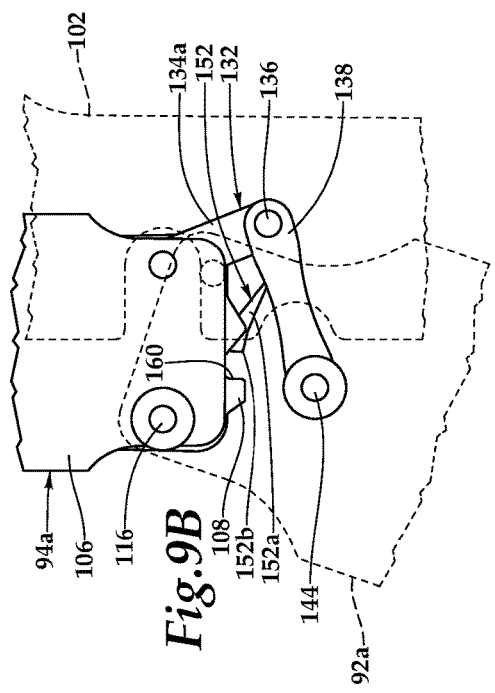

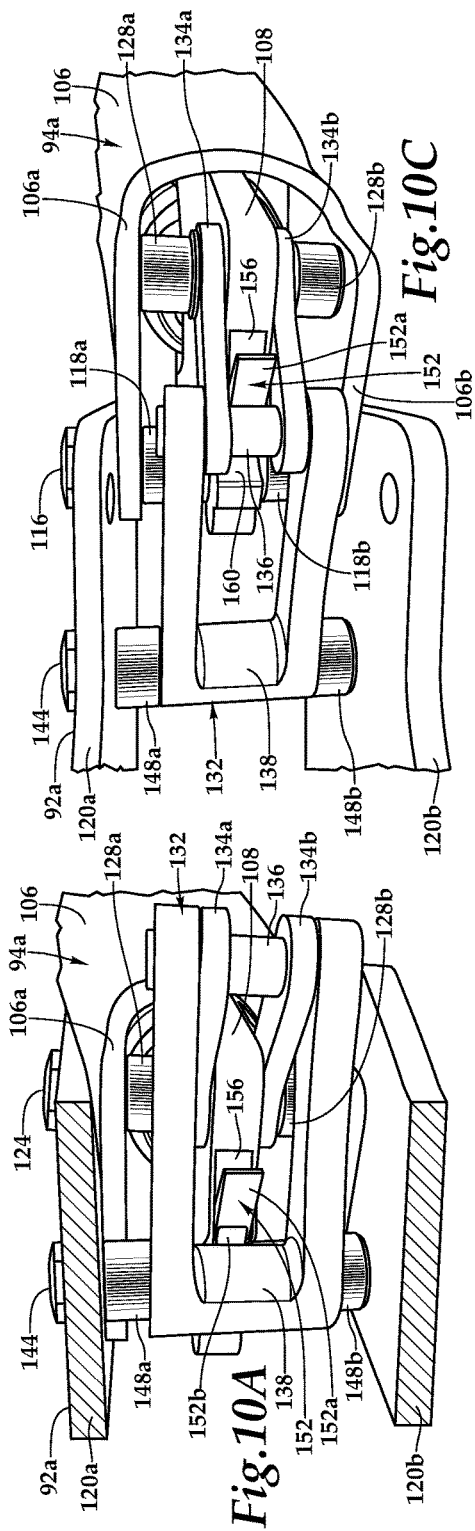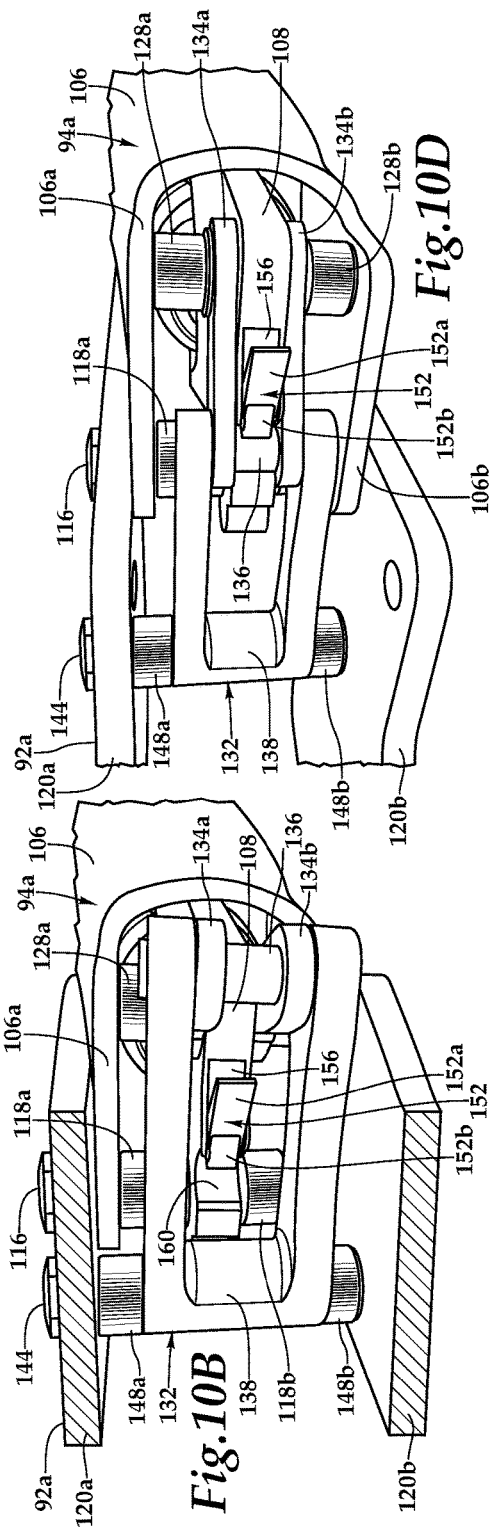

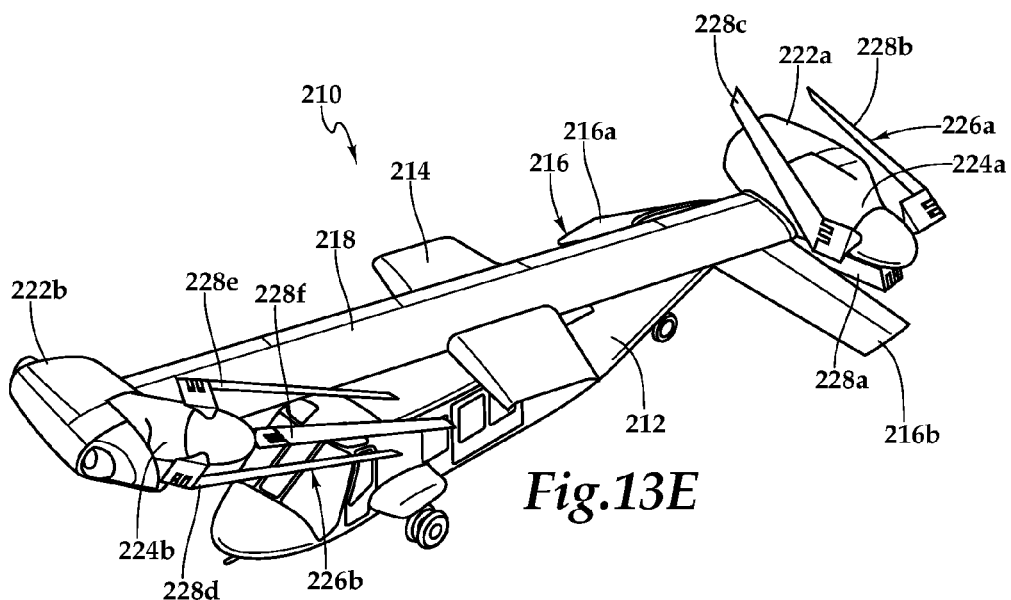
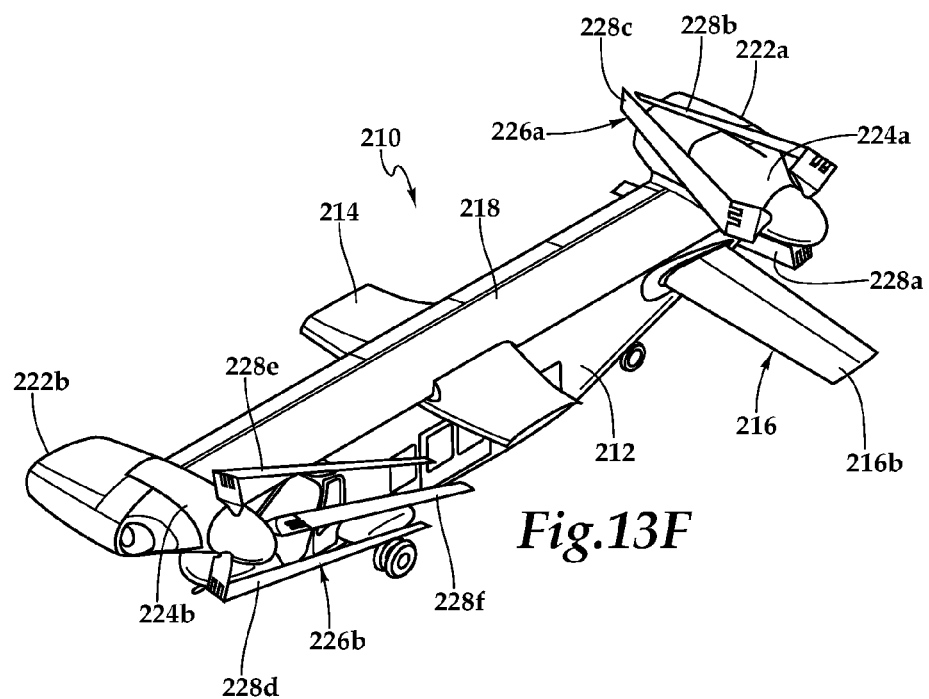

STORAGE MODES FOR TILTROTOR AIRCRAFT

TECHNICAL FIELD OF THE DISCLOSURE

The present disclosure relates, in general, to tiltrotor aircraft having a VTOL flight mode, a forward flight mode and a storage mode and, in particular, to systems and method of stowing the rotor blades and the wing of a tiltrotor aircraft to reduced the footprint of the tiltrotor aircraft in the storage mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation in a VTOL flight mode and a generally vertical plane of rotation while cruising in a forward flight mode, wherein the fixed wing provides lift and the proprotors provide forward thrust. In this manner, tiltrotor aircraft combine the vertical lift capability of a helicopter with the speed and range of fixed-wing aircraft.

It has been found, however, that tiltrotor aircraft may occupy a large footprint when not in use, such as during storage on an aircraft carrier flight deck. Accordingly, certain tiltrotor aircraft are operable to perform a conversion from flight mode to storage mode, as seen in prior art FIGS. 1A-1D. In FIG. 1A, a tiltrotor aircraft is shown in VTOL flight mode with the nacelles positioned in a generally vertical orientation and with the proprotors operable for rotation in a generally horizontal plane. In FIG. 1B, two of the rotor blades of each proprotor have been folded in the beamwise direction such that all blades are generally parallel to the wing. In FIG. 1C, the nacelles have been rotated approximately ninety degrees relative to the wing to a generally horizontal orientation. In FIG. 1D, the wing has been rotated approximately ninety degrees relative to the fuselage of the tiltrotor aircraft such that the wing is generally parallel with the fuselage. In the illustrated storage mode of the tiltrotor aircraft, its footprint has been minimized. It has been found, however, that storing a tiltrotor aircraft with the rotor blades fully cantilevered to one side of the drive system results in an undesirably large moment being placed on the drive system, which may cause damage to bearings or other components of the drive system. Accordingly, a need has arisen for improved storage modes for tiltrotor aircraft.

SUMMARY

In a first aspect, the present disclosure is directed to a tiltrotor aircraft having a VTOL flight mode, a forward flight mode and a storage mode. The aircraft includes a fuselage and a wing rotatably mounted to the fuselage and having first and second outboard ends. The wing is reversibly rotatable between a flight orientation, generally perpendicular to the fuselage, in the flight modes, and a stowed orientation, generally parallel to the fuselage, in the storage mode. First and second pylon assemblies are respectively positioned proximate the first and second outboard ends of the wing. First and second mast assemblies are respectively rotatable relative to the first and second pylon assemblies. The first and second mast assemblies are reversibly rotatable between a generally vertical orientation, in the VTOL flight mode, and a generally horizontal orientation, in the forward flight mode and the storage mode. First and second proprotor assemblies are respectively rotatable relative to the first and second mast assemblies. The first and second proprotor assemblies each includes first, second and third rotor blades and each have a radially extended orientation, in the flight modes, and a stowed orientation, in the storage mode, wherein the first rotor blade of each proprotor assembly is folded beamwise below the wing generally conforming with the respective pylon assembly and the second and third rotor blades of each proprotor assembly are folded beamwise above the wing generally conforming with the respective pylon assembly.

In some embodiments, first and second tail members may be mounted to the fuselage and may be reversibly rotatable between a dihedral orientation, in the flight modes, and an anhedral orientation, in the storage mode. In certain embodiments, the first proprotor assembly may rotate in phase with the second proprotor assembly and/or the first and second proprotor assemblies may have matched counter rotation. In some embodiments, each proprotor assembly may include a rotor hub to which the respective rotor blades are hingeably coupled thereto. In certain embodiments, each proprotor assembly may include a plurality of rotor blade actuators, such as rotary actuators, that are operable to reversibly rotate the respective rotor blades between the radially extended orientation and the stowed orientation. In some embodiments, each mast assembly may include a pitch control assembly that is operable to control a collective pitch of the rotor blades of the respective proprotor assembly. In certain embodiments, each pylon assemblies may include a conversion actuator, such as a linear actuator, that is operable to reversibly rotate the respective mast assembly between the generally vertical orientation and the generally horizontal orientation.

In a second aspect, the present disclosure in directed to a method of converting a tiltrotor aircraft from a VTOL flight mode to a storage mode. The aircraft includes a fuselage, a wing rotatably mounted to the fuselage and having first and second outboard ends, first and second pylon assemblies respectively positioned proximate the first and second outboard ends of the wing, first and second mast assemblies respectively rotatable relative to the first and second pylon assemblies and first and second proprotor assemblies respectively rotatable relative to the first and second mast assemblies. The method includes rotating the first and second mast assemblies from a generally vertical orientation to a generally horizontal orientation; folding a first rotor blade of each proprotor assembly beamwise from a radially extended orientation to a stowed orientation beneath the wing and generally conforming with the respective pylon assembly; folding second and third rotor blades of each proprotor assembly beamwise from radially extended orientations to stowed orientations above the wing and generally conforming with the respective pylon assembly; and rotating the wing from a flight orientation, generally perpendicular to the fuselage, to a stowed orientation, generally parallel to the fuselage.

The method may also include rotating first and second tail members mounted to the fuselage from a dihedral orientation to an anhedral orientation; counter rotating the proprotor assemblies, for example 30 degrees, during the step of folding the first rotor blade of each proprotor assembly beamwise from the radially extended orientation to the stowed orientation and/or collectively adjusting a pitch of the rotor blades of each proprotor assembly before the folding steps.

The method may also involve performing at least a portion of the step of folding the first rotor blade of each proprotor assembly beamwise from the radially extended orientation to the stowed orientation while the first and second mast assemblies are being rotated from the generally vertical orientation to the generally horizontal orientation; performing at least a portion of the step of folding the second and third rotor blades of each proprotor assembly beamwise from radially extended orientations to stowed orientations while the first and second mast assemblies are being rotated from the generally vertical orientation to the generally horizontal orientation; performing at least a portion of the step of folding the first rotor blade of each proprotor assembly beamwise from the radially extended orientation to the stowed orientation while the wing is being rotated from the flight orientation, generally perpendicular to the fuselage, to the stowed orientation, generally parallel to the fuselage; performing at least a portion of the step of folding the second and third rotor blades of each proprotor assembly beamwise from radially extended orientations to stowed orientations while the wing is being rotated from the flight orientation, generally perpendicular to the fuselage, to the stowed orientation, generally parallel to the fuselage and/or performing at least a portion of the step of rotating the first and second mast assemblies from the generally vertical orientation to the generally horizontal orientation while the wing is being rotated from the flight orientation, generally perpendicular to the fuselage, to the stowed orientation, generally parallel to the fuselage.

In a third aspect, the present disclosure is directed to a tiltrotor aircraft having a VTOL flight mode, a forward flight mode and a storage mode. The aircraft includes a fuselage and a wing rotatably mounted to the fuselage and having first and second outboard ends. The wing is reversibly rotatable between a flight orientation, generally perpendicular to the fuselage, in the flight modes, and a stowed orientation, generally parallel to the fuselage, in the storage mode. First and second pylon assemblies are respectively positioned proximate the first and second outboard ends of the wing. First and second mast assemblies are respectively rotatable relative to the first and second pylon assemblies. The first and second mast assemblies are reversibly rotatable between a generally vertical orientation, in the VTOL flight mode, and a generally horizontal orientation, in the forward flight mode and the storage mode. First and second proprotor assemblies are respectively rotatable relative to the first and second mast assemblies. The first and second proprotor assemblies each includes first, second and third rotor blades and each have a radially extended orientation, in the flight modes, and a stowed orientation, in the storage mode, wherein the first rotor blade of each proprotor assembly is folded chordwise below the wing generally conforming with the respective pylon assembly, the second rotor blade of each proprotor assembly is folded chordwise above the wing generally conforming with the respective pylon assembly and the third rotor blade of each proprotor assembly is inboardly extended generally parallel with the wing.

In some embodiments, each proprotor assembly may include a plurality of rotor blade locking assemblies that are operable to enable reversible rotation, such as manual reversible rotation, of the respective rotor blades between the radially extended orientation and the stowed orientation. In certain embodiments, the rotor blade locking assemblies may be operable to lock the respective rotor blades in the stowed orientation.

In a fourth aspect, the present disclosure in directed to a method of converting a tiltrotor aircraft from a VTOL flight mode to a storage mode. The aircraft includes a fuselage, a wing rotatably mounted to the fuselage and having first and second outboard ends, first and second pylon assemblies respectively positioned proximate the first and second outboard ends of the wing, first and second mast assemblies respectively rotatable relative to the first and second pylon assemblies and first and second proprotor assemblies respectively rotatable relative to the first and second mast assemblies. The method includes rotating the first and second mast assemblies from a generally vertical orientation to a generally horizontal orientation; positioning a first rotor blade of each proprotor assembly in a generally upwardly extending vertical orientation; folding a second rotor blade of each proprotor assembly chordwise from a radially extended orientation to an intermediate orientation; positioning a third rotor blade of each proprotor assembly in a inboardly extending generally parallel with the wing orientation; folding the second rotor blade of each proprotor assembly chordwise from the intermediate orientation to a stowed orientation beneath the wing and generally conforming with the respective pylon assembly; folding the first rotor blade of each proprotor assembly chordwise from a radially extended orientation to a stowed orientation above the wing and generally conforming with the respective pylon assembly; and rotating the wing from a flight orientation, generally perpendicular to the fuselage, to a stowed orientation, generally parallel to the fuselage.

The method may also include counter rotating the proprotor assemblies between the steps of positioning the first rotor blade of each proprotor assembly in the generally upwardly extending vertical orientation and positioning the third rotor blade of each proprotor assembly in the inboardly extending generally parallel with the wing orientation; feathering the rotor blades of each proprotor assembly before the folding steps; manually folding the second rotor blade of each proprotor assembly chordwise from the radially extended orientation to the intermediate orientation; manually folding the second rotor blade of each proprotor assembly chordwise from the intermediate orientation to the stowed orientation; manually folding the first rotor blade of each proprotor assembly chordwise from the radially extended orientation to the stowed orientation and/or locking the first and second rotor blades of each proprotor assembly in the stowed orientations.

In a fifth aspect, the present disclosure is directed to a tiltrotor aircraft having a VTOL flight mode, a forward flight mode and a storage mode. The aircraft includes a fuselage and a wing rotatably mounted to the fuselage and having first and second outboard ends. The wing is reversibly rotatable between a flight orientation, generally perpendicular to the fuselage, in the flight modes, and a stowed orientation, generally parallel to the fuselage, in the storage mode. First and second pylon assemblies are respectively positioned proximate the first and second outboard ends of the wing. First and second mast assemblies are respectively rotatable relative to the first and second pylon assemblies. The first and second mast assemblies are reversibly rotatable between a generally vertical orientation, in the VTOL flight mode, and a generally horizontal orientation, in the forward flight mode and the storage mode. First and second proprotor assemblies are respectively rotatable relative to the first and second mast assemblies. The first and second proprotor assemblies each includes first, second and third rotor blades and each have a radially extended orientation, in the flight modes, and a stowed orientation, in the storage mode, wherein the first and second rotor blades of each proprotor assembly are folded beamwise to be generally parallel with the respective third rotor blade, the rotor blades of the first proprotor assembly have an ascending orientation relative to the wing and the rotor blades of the second proprotor assembly a descending orientation relative to the wing.

In some embodiments, in the storage mode, the first proprotor assembly may be positioned aft of the second proprotor assembly. In certain embodiments, the ascending orientation of the rotor blades of the first proprotor assembly relative to the wing may be an angle of approximately 30 degrees and the descending orientation of the rotor blades of the second proprotor assembly relative to the wing may be an angle of approximately 30 degrees. In some embodiments, the first proprotor assembly may rotate approximately 60 degrees out of phase with the second proprotor assembly.

In a sixth aspect, the present disclosure in directed to a method of converting a tiltrotor aircraft from a VTOL flight mode to a storage mode. The aircraft includes a fuselage, a wing rotatably mounted to the fuselage and having first and second outboard ends, first and second pylon assemblies respectively positioned proximate the first and second outboard ends of the wing, first and second mast assemblies respectively rotatable relative to the first and second pylon assemblies and first and second proprotor assemblies respectively rotatable relative to the first and second mast assemblies. The method includes folding first and second rotor blades of each proprotor assembly beamwise to be generally parallel with a respective third rotor blade; rotating the wing from a flight orientation, generally perpendicular to the fuselage, to a stowed orientation, generally parallel to the fuselage; rotating the first and second mast assemblies from a generally vertical orientation to a generally horizontal orientation; and counter rotating the first and second proprotor assemblies such that the rotor blades of the first proprotor assembly have an ascending orientation relative to the wing and the rotor blades of the second proprotor assembly have a descending orientation relative to the wing.

The method may also include counter rotating the first and second proprotor assemblies such that the ascending orientation of the rotor blades of the first proprotor assembly relative to the wing may be an angle of approximately 30 degrees and the descending orientation of the rotor blades of the second proprotor assembly relative to the wing may be an angle of approximately 30 degrees and/or positioning the first proprotor assembly aft of the second proprotor assembly.

The method may also involve performing at least a portion of the step of folding the first and second rotor blades of each proprotor assembly beamwise to be generally parallel with the respective third rotor blade while the first and second proprotor assemblies are being counter rotated; performing at least a portion of the step of folding the first and second rotor blades of each proprotor assembly beamwise to be generally parallel with the respective third rotor blade while the wing is being rotated from the flight orientation, generally perpendicular to the fuselage, to the stowed orientation, generally parallel to the fuselage and/or performing the step of folding the first and second rotor blades of each proprotor assembly beamwise to be generally parallel with the respective third rotor blade before rotating the first and second mast assemblies from the generally vertical orientation to the generally horizontal orientation.

In a seventh aspect, the present disclosure is directed to a tiltrotor aircraft having a VTOL flight mode, a forward flight mode and a storage mode. The aircraft includes a fuselage and a wing rotatably mounted to the fuselage and having first and second outboard ends. The wing is reversibly rotatable between a flight orientation, generally perpendicular to the fuselage, in the flight modes, and a stowed orientation, generally parallel to the fuselage, in the storage mode. First and second pylon assemblies are respectively positioned proximate the first and second outboard ends of the wing. First and second mast assemblies are respectively rotatable relative to the first and second pylon assemblies. The first and second mast assemblies are reversibly rotatable between a generally vertical orientation, in the VTOL flight mode, and a generally horizontal orientation, in the forward flight mode and the storage mode. First and second proprotor assemblies are respectively rotatable relative to the first and second mast assemblies. The first and second proprotor assemblies each includes first, second and third rotor blades and each have a radially extended orientation, in the flight modes, and a stowed orientation, in the storage mode, wherein the first rotor blade of the first proprotor assembly is folded beamwise below the wing generally conforming with the respective pylon assembly, the second and third rotor blades of the first proprotor assembly are folded beamwise above the wing generally conforming with the respective pylon assembly, the first and second rotor blades of the second proprotor assembly are folded beamwise to be generally parallel with the third rotor blade of the second proprotor assembly and the rotor blades of the second proprotor assembly have a descending orientation relative to the wing.

In an eighth aspect, the present disclosure in directed to a method of converting a tiltrotor aircraft from a VTOL flight mode to a storage mode. The aircraft includes a fuselage, a wing rotatably mounted to the fuselage and having first and second outboard ends, first and second pylon assemblies respectively positioned proximate the first and second outboard ends of the wing, first and second mast assemblies respectively rotatable relative to the first and second pylon assemblies and first and second proprotor assemblies respectively rotatable relative to the first and second mast assemblies. The method includes rotating the first and second mast assemblies from a generally vertical orientation to a generally horizontal orientation; folding a first rotor blade of the first proprotor assembly beamwise from a radially extended orientation to a stowed orientation beneath the wing and generally conforming with the respective pylon assembly;

folding second and third rotor blades of the first proprotor assembly beamwise from radially extended orientations to stowed orientations above the wing and generally conforming with the respective pylon assembly; folding first and second rotor blades of the second proprotor assembly beamwise to be generally parallel with a third rotor blade of the second proprotor assembly; rotating the wing from a flight orientation, generally perpendicular to the fuselage, to a stowed orientation, generally parallel to the fuselage; and counter rotating the first and second proprotor assemblies such that the rotor blades of the second proprotor assembly have a descending orientation relative to the wing.

The method may also involve performing at least a portion of the step of folding the first rotor blade of the first proprotor assembly beamwise from the radially extended orientation to the stowed orientation while the first mast assemblies is being rotated from the generally vertical orientation to the generally horizontal orientation; performing the step of rotating the first mast assembly from the generally vertical orientation to the generally horizontal orientation before rotating the second mast assembly from the generally vertical orientation to the generally horizontal orientation; performing at least a portion of the step of rotating the second mast assembly from the generally vertical orientation to the generally horizontal orientation while the wing is being rotated from the flight orientation, generally perpendicular to the fuselage, to the stowed orientation, generally parallel to the fuselage and/or performing the step of folding the first and second rotor blades of the second proprotor assembly beamwise to be generally parallel with the respective third rotor blade before rotating the second mast assembly from the generally vertical orientation to the generally horizontal orientation.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 7A-7B are schematic illustrations of a rotor blade in a radially extended orientation and a stowed orientation in accordance with embodiments of the present disclosure;

FIGS. 9A-9D are top views of a rotor blade hinging and locking assembly for manually operating a rotor blade between a radially extended orientation and a stowed orientation in accordance with embodiments of the present disclosure;

FIGS. 10A-10D are side views of a rotor blade hinging and locking assembly for manually operating a rotor blade between a radially extended orientation and a stowed orientation in accordance with embodiments of the present disclosure;

FIGS. 13A-13F are schematic illustrations of an exemplary tiltrotor aircraft transitioning between VTOL flight mode and storage mode in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
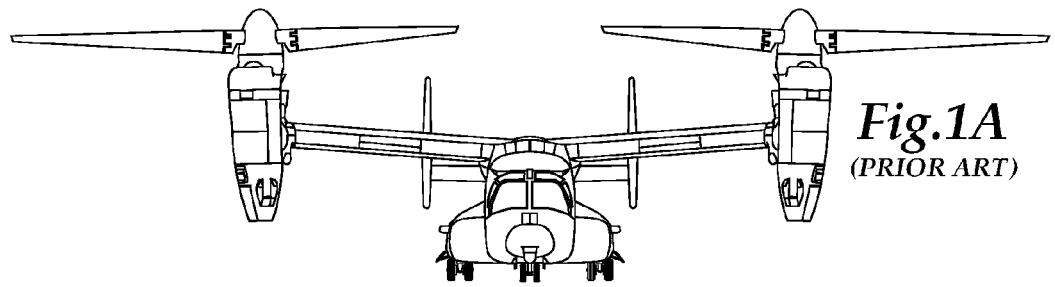
FIGS. 1A-1D are prior art drawings depicting a tiltrotor aircraft transitioning from a VTOL flight mode to a storage mode.
Figure 1B:
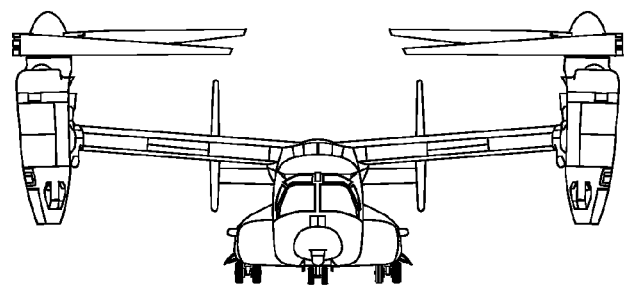
Figure 1C:
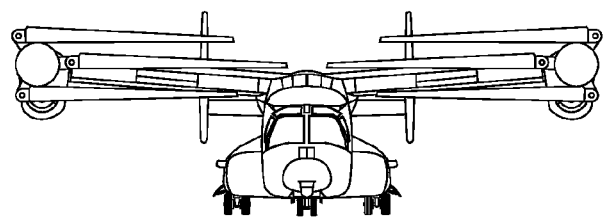
Figure 1D:
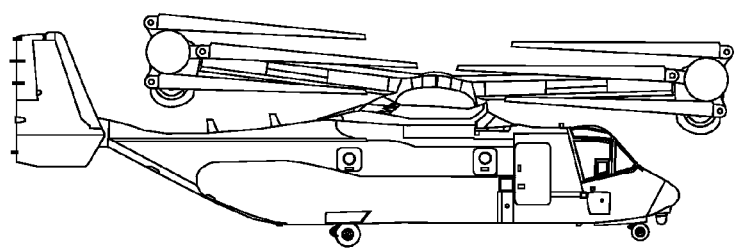
Figure 2A:
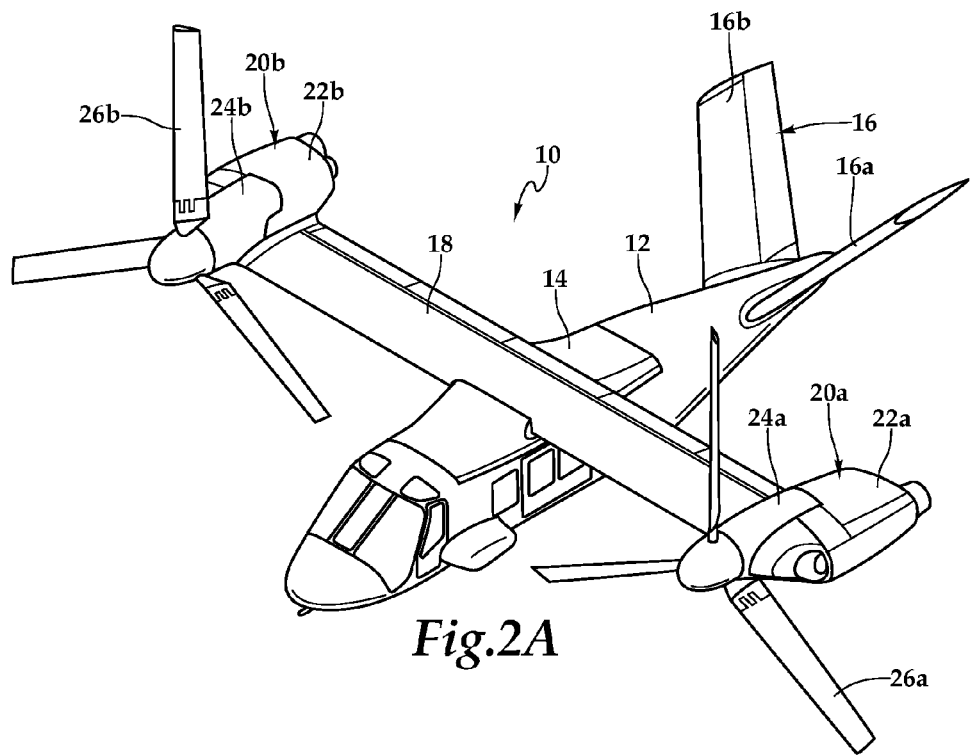
FIGS. 2A-2B are schematic illustrations of an exemplary tiltrotor aircraft in forward flight mode and in VTOL flight mode in accordance with embodiments of the present disclosure.
Figure 2B:
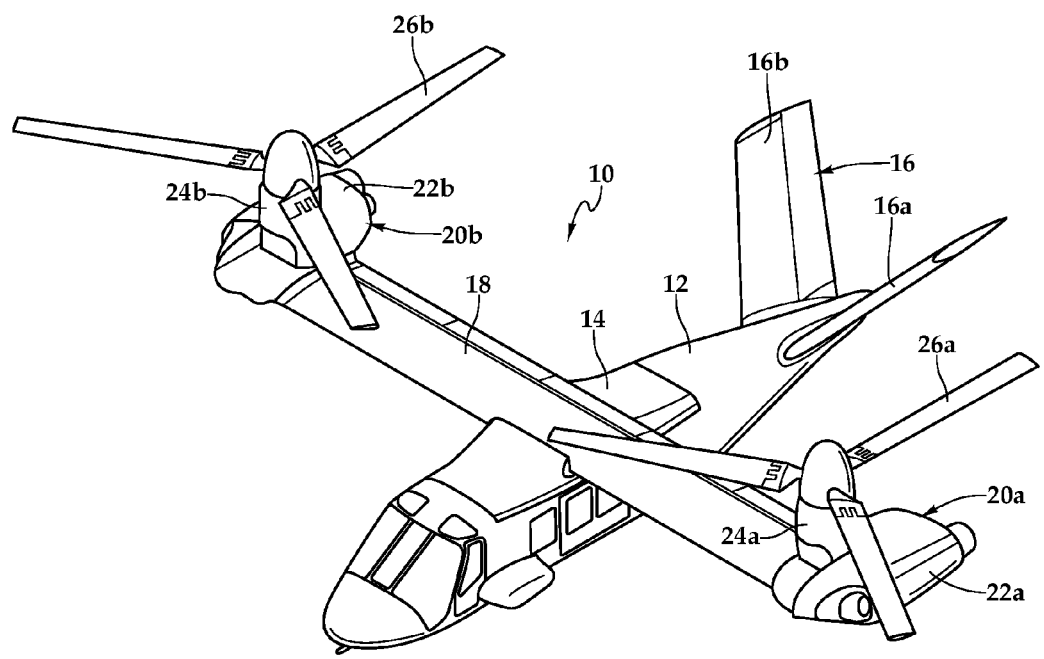

Referring to FIGS. 2A-2B in the drawings, a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing member 18 is supported by wing mount assembly 14 and rotates with wing mount assembly 14 relative to fuselage 12 as discussed herein. Located at outboard ends of wing member 18 are propulsion assemblies 20a, 20b. Propulsion assembly 20a includes a nacelle depicted as fixed pylon 22a that houses an engine and transmission. In addition, propulsion assembly 20a includes a mast assembly 24a that is rotatable relative to fixed pylon 22a between a generally horizontal orientation, as best seen in FIG. 2A, a generally vertical orientation, as best seen in FIG. 2B. Propulsion assembly 20a also includes a proprotor assembly 26a that is rotatable relative to mast assembly 24a responsive to torque and rotational energy provided via a rotor hub assembly and drive system mechanically coupled to the engine and transmission. Likewise, propulsion assembly 20b includes a nacelle depicted as fixed pylon 22b that houses an engine and transmission, a mast assembly 24b that is rotatable relative to fixed pylon 22b and a proprotor assembly 26b that is rotatable relative to mast assembly 24b responsive to torque and rotational energy provided via a rotor hub assembly and drive system mechanically coupled to the engine and transmission.

FIG. 2A illustrates aircraft 10 in airplane or forward flight mode, in which proprotor assemblies 26a, 26b are rotating in a substantially vertical plane to provide a forward thrust enabling wing member 18 to provide a lifting force responsive to forward airspeed, such that aircraft 10 flies much like a conventional propeller driven aircraft. FIG. 2B illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between forward flight mode and VTOL flight mode, which can be referred to as a conversion flight mode. Even though aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within the fuselage that provides torque and rotational energy to both proprotor assemblies 26a, 26b.

In the illustrated embodiment, proprotor assemblies 26a, 26b each include three twisted rotor blades that are equally spaced apart circumferentially at approximately 120 degree intervals. It should be understood by those having ordinary skill in the art, however, that proprotor assemblies 26a, 26b of the present disclosure could have rotor blades with other designs and other configurations. During flight modes, proprotor assemblies 26a, 26b rotate in opposite directions to provide torque balancing to aircraft 10. For example, when viewed from the front of aircraft 10 in forward flight mode, proprotor assembly 26a rotates clockwise and proprotor assembly 26b rotates counterclockwise. In addition, proprotor assemblies 26a, 26b rotate in phase with each other such that the rotor blades of each proprotor assembly 26a, 26b pass wing member 18 at the same time during all modes of operation of aircraft 10. Further, as discussed herein, proprotor assemblies 26a, 26b are mechanically coupled to a common interconnect drive shaft such that proprotor assemblies 26a, 26b have matched counter rotation wherein any rotation of one proprotor assembly 26a, 26b results in an equal counter rotation of the other of proprotor assembly 26a, 26b.

Figure 3A:
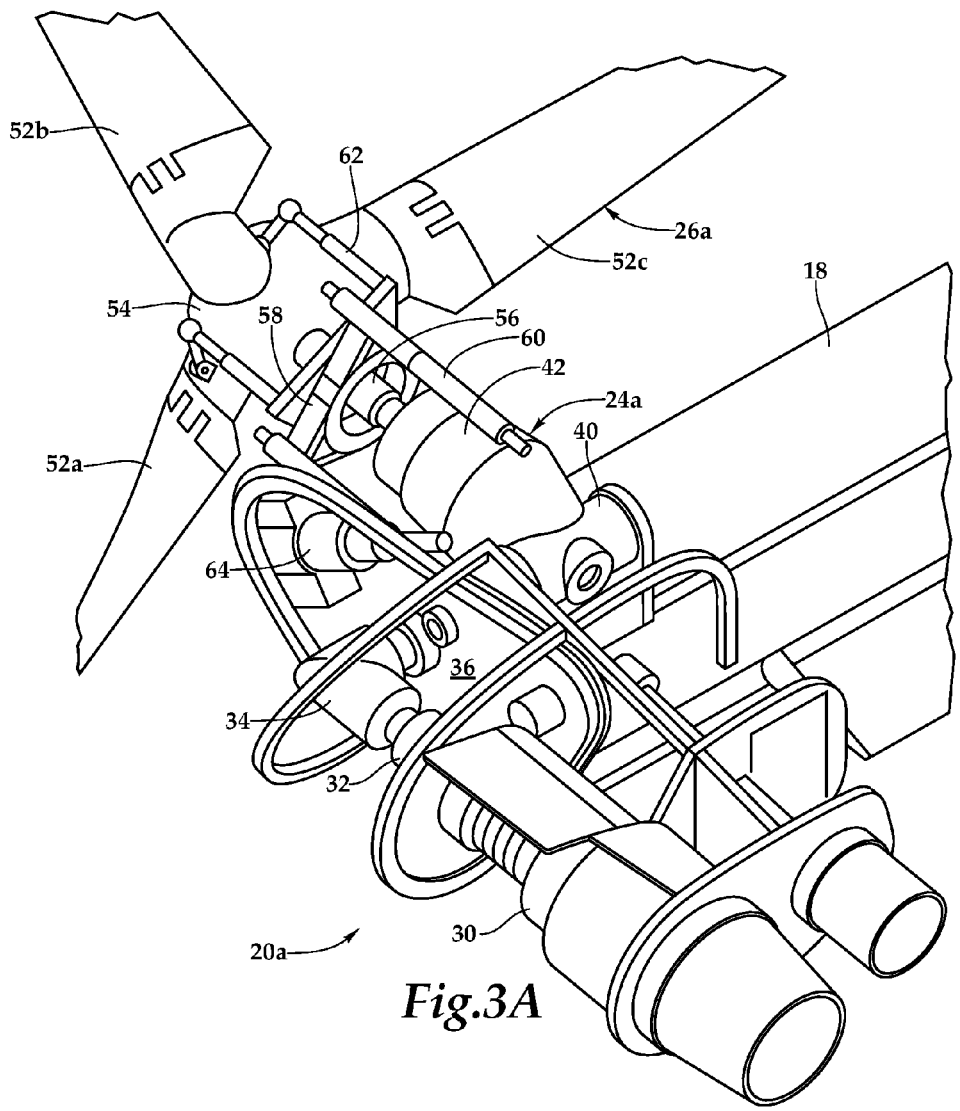
FIG. 3A is an isometric view of an exemplary propulsion system for a tiltrotor aircraft in accordance with embodiments of the present disclosure.
Figure 3B:
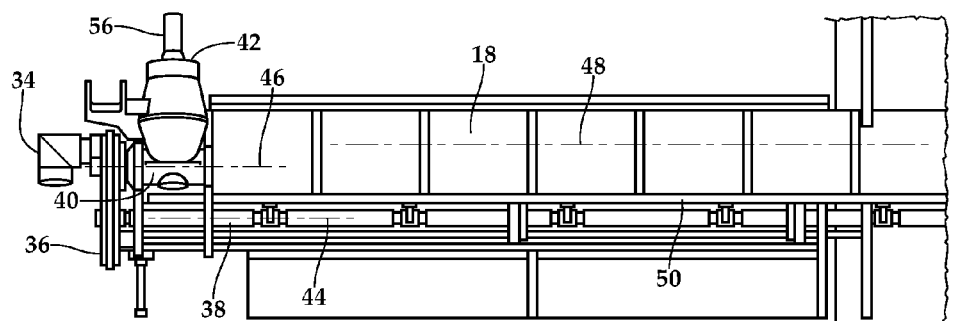
FIG. 3B is a top view of an exemplary wing section of a tiltrotor aircraft in accordance with embodiments of the present disclosure.

Referring now to FIGS. 3A-3B, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion assembly 20a includes an engine 30 that is fixed relative to wing 18. An engine output shaft 32 transfers power from engine 30 to a spiral bevel gearbox 34 that includes spiral bevel gears to change torque direction by 90 degrees from engine 30 to a fixed gearbox 36 via a clutch. Fixed gearbox 36 includes a plurality of gears, such as helical gears, in a gear train that are coupled to an interconnect drive shaft 38 and a quill shaft (not visible) that supplies torque to an input in spindle gearbox 40 of proprotor gearbox 42.

Interconnect drive shaft 38 provides a torque path that enables a single engine of aircraft 10 to provide torque to both proprotors 26a, 26b in the event of a failure of the other engine. In the illustrated embodiment, interconnect drive shaft 38 has a rotational axis 44 that is aft of a conversion axis 46 of spindle gearbox 40. Conversion axis 46 is parallel to a lengthwise axis 48 of wing 18. In the illustrated embodiment, interconnect drive shaft 38 includes a plurality of segments that share common rotational axis 44. The location of interconnect drive shaft 38 aft of wing spar 50 provides for optimal integration with fixed gearbox 36 without interfering with the primary torque transfer in the quill shaft between fixed gearbox 36 and spindle gearbox 40.

Engine 30 is housed and supported in fixed pylon 22a (see FIGS. 2A-2B) that may include features such as an inlet, aerodynamic fairings and exhaust, as well as other structures and systems to support and facilitate the operation of engine 30. Proprotor 26a of propulsion assembly 20a includes three rotor blades 52a, 52b, 52c that are hingeably coupled to grip assemblies of a rotor hub 54. Rotor hub 54 is coupled to a mast 56 that is coupled to proprotor gearbox 42. Together, spindle gearbox 40, proprotor gearbox 42 and mast 56 are part of mast assembly 24a that rotates relative to fixed pylon 22a. In addition, it should be appreciated by those having ordinary skill in the art that mast assembly 24a may include different or additional components, such as a pitch control assembly depicted as swashplate 58, actuators 60 and pitch links 62, wherein swashplate 58 is selectively actuated by actuators 60 to selectively control the collective pitch and the cyclic pitch of rotor blades 52a, 52b, 52c via pitch links 62. A linear actuator, depicted as conversion actuator 64 of fixed pylon 22a, is operable to reversibly rotate mast assembly 24a relative to fixed pylon 22a, which in turn selectively positions proprotor assembly 26a between forward flight mode, in which proprotor assembly 26a is rotating in a substantially vertical plane, and VTOL flight mode, in which proprotor assembly 26a is rotating in a substantially horizontal plane.

Figure 4A:
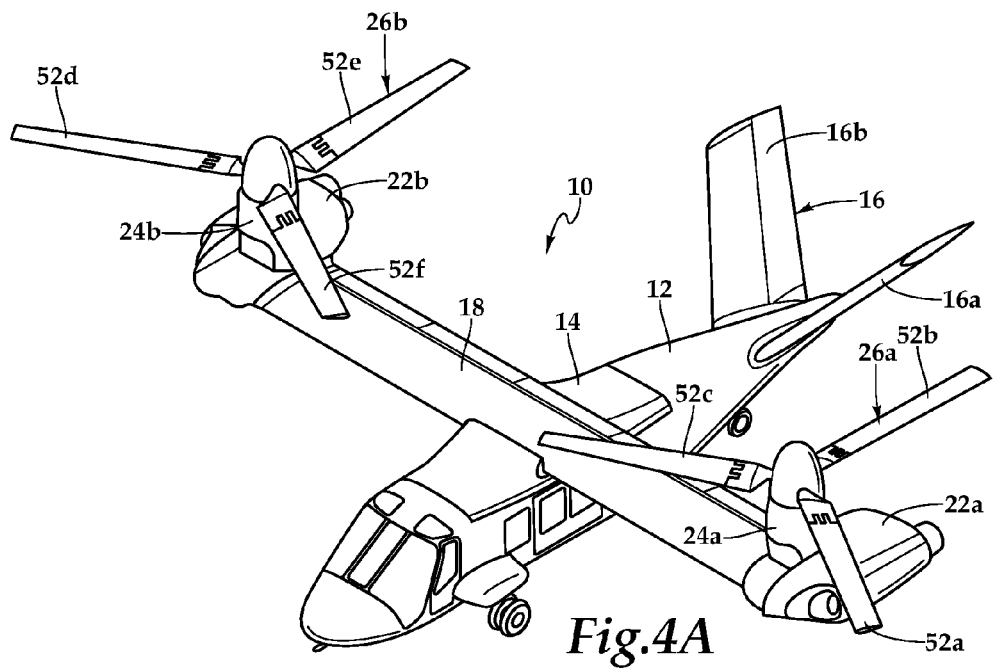
FIGS. 4A-4F are schematic illustrations of an exemplary tiltrotor aircraft transitioning between VTOL flight mode and storage mode in accordance with embodiments of the present disclosure.
Figure 4B:
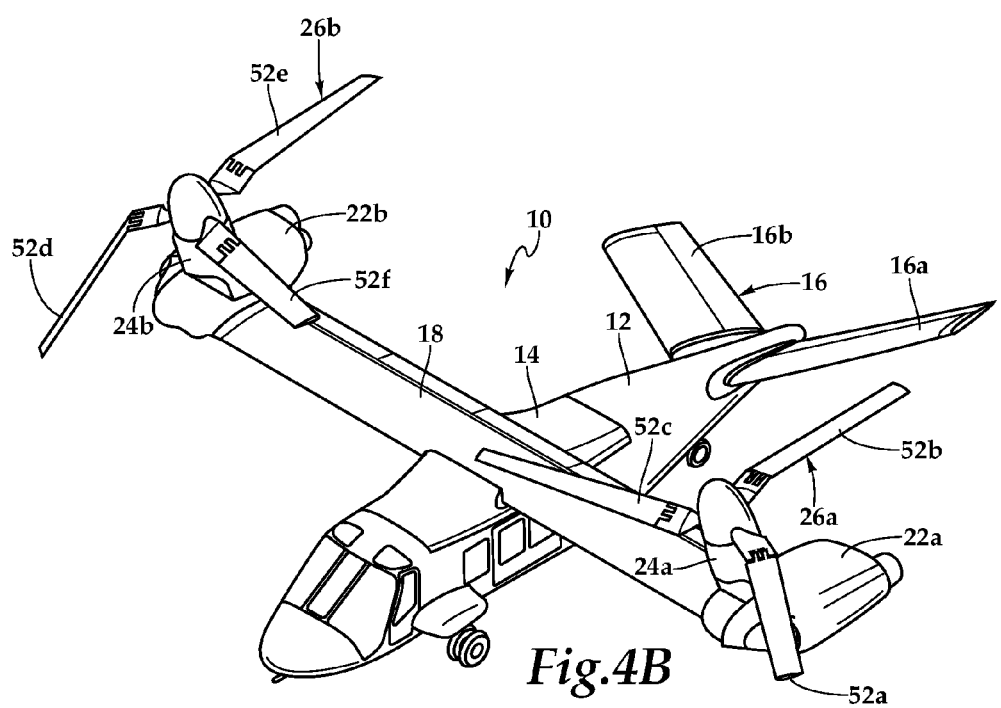
Figure 4C:
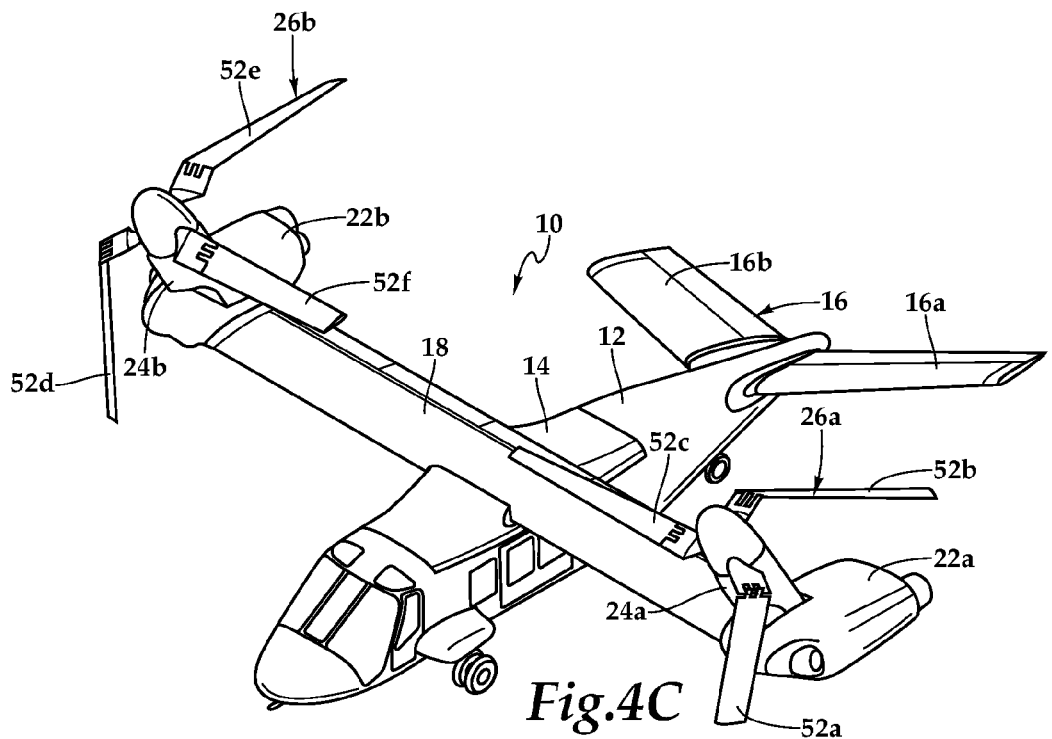
Figure 4D:
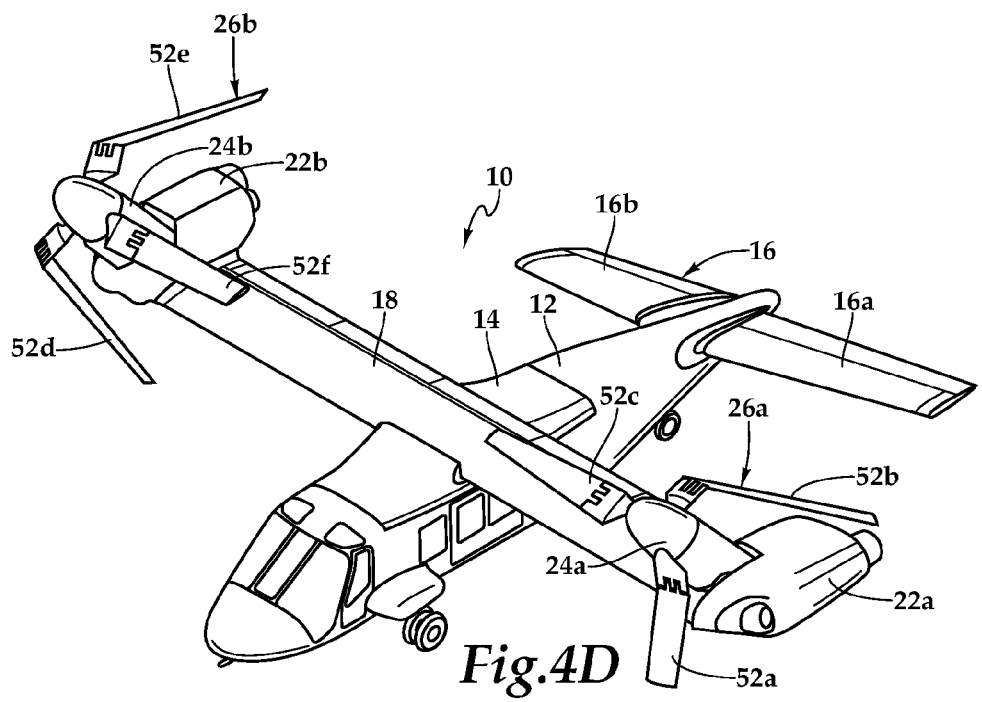
Figure 4E:
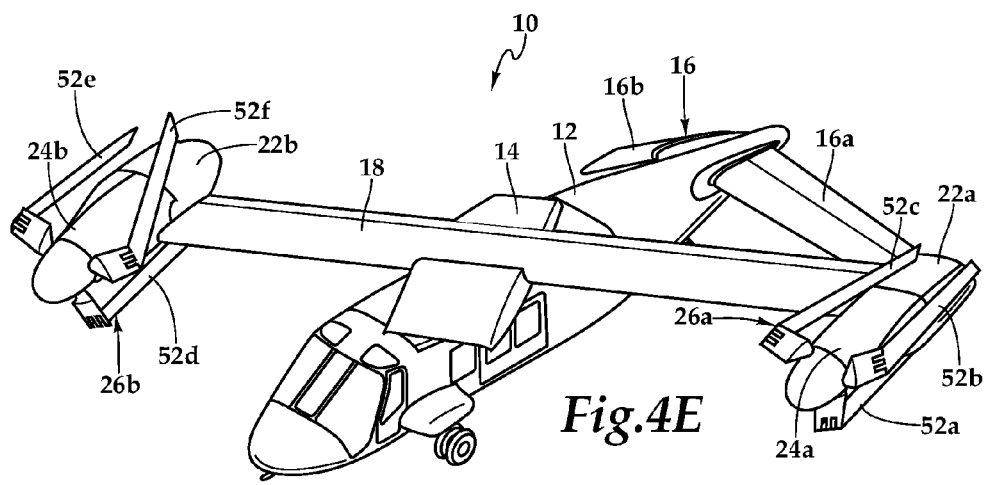
Figure 4F:
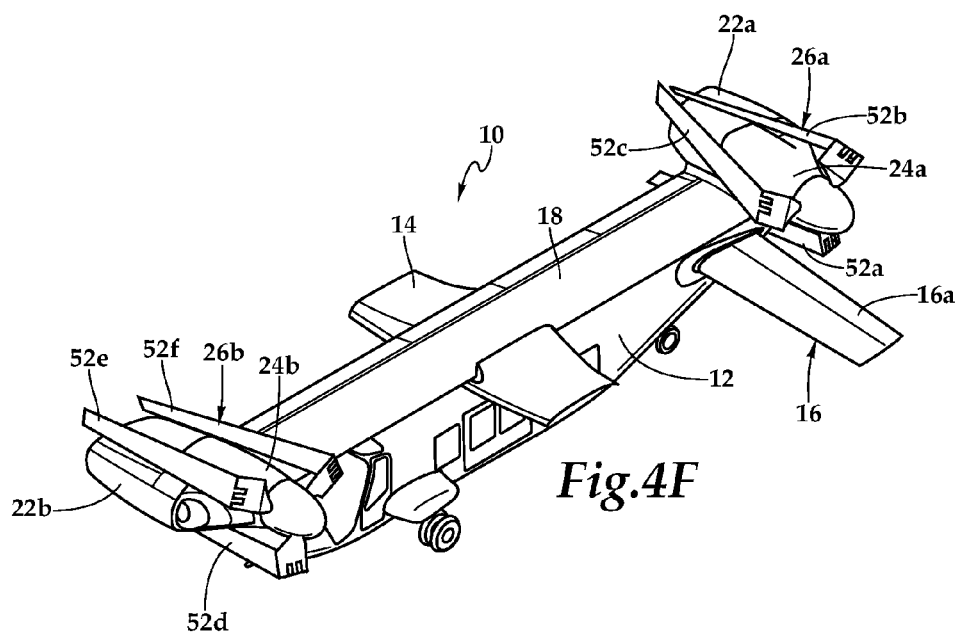

Referring next to FIGS. 4A-4F of the drawings, tiltrotor aircraft 10 is depicted in various states during a transition between VTOL flight mode and storage mode. Aircraft 10 has a VTOL flight mode, as best seen in FIG. 2B, a forward flight mode, as best seen in FIG. 2A, and a storage mode, as best seen in FIG. 4F. As discussed above, aircraft 10 includes fuselage 12 and wing 18 that is rotatably mounted to fuselage 12. Wing 18 is reversibly rotatable between a flight orientation that is generally perpendicular to fuselage 12, as best seen in FIG. 4A, and a stowed orientation that is generally parallel to fuselage 12, as best seen in FIG. 4F. Pylon assemblies 22a, 22b are positioned proximate the outboard ends of wing 18. Mast assemblies 24a, 24b are respectively rotatable relative to pylon assemblies 22a, 22b. Mast assemblies 24a, 24b are reversibly rotatable between a generally vertical orientation, as best seen in FIG. 4A, and a generally horizontal orientation, as best seen in FIG. 4F. Proprotor assemblies 26a, 26b are respectively rotatable relative to mast assemblies 24a, 24b. Proprotor assembly 26a includes rotor blades 52a, 52b, 52c and proprotor assembly 26b includes rotor blades 52d, 52e, 52f. Proprotor assemblies 26a, 26b each have a radially extended orientation, as best seen in FIG. 4A, and a stowed orientation, as best seen in FIG. 4F. More specifically in the stowed orientation, rotor blade 52a of proprotor assembly 26a is folded beamwise below wing 18 and generally conforming with pylon assembly 22a and rotor blade 52d of proprotor assembly 26b is folded beamwise below wing 18 and generally conforming with pylon assembly 22b. Rotor blades 52b, 52c of proprotor assembly 26a are folded beamwise above wing 18 and generally conforming with pylon assembly 22a and rotor blades 52e, 52f of proprotor assembly 26b are folded beamwise above wing 18 and generally conforming with pylon assembly 22b.

An example conversion operation of aircraft 10 from VTOL flight mode to storage mode will now be described. During conversion processes, it is important to avoid contact between the various components of aircraft 10 with each other as well as to avoid contact between the various components of aircraft 10 and the surface on which aircraft 10 rests. To achieve this result, certain of the conversion steps, or portions thereof, may need to be performed before or while other steps, or portions thereof, are being performed. These sequential and/or simultaneous operations are enabled by having individually controlled actuators operating to transition the various components of aircraft 10 independent of one another. For example, rotation of wing 18 relative to fuselage 12 is independent of rotation of mast assembly 24a relative to pylon assembly 22a. Likewise, rotation of mast assembly 24a relative to pylon assembly 22a is independent of rotation mast assembly 24b relative to pylon assembly 22b. Similarly, rotation of mast assembly 24a relative to pylon assembly 22a is independent of rotation of rotor blades 52a, 52b, 52c relative to rotor hub 54. In addition, rotation of rotor blade 52a relative to rotor hub 54 is independent of rotation of rotor blade 52b and independent of rotation of rotor blade 52c relative to rotor hub 54. As such, those having ordinary skill in the art will understand that all such operations may be controlled individually and independent of one another. Accordingly, the order of operations and sequencing thereof may take a variety of forms, each of which is considered to be within the scope of the present disclosure.

In FIG. 4A, aircraft 10 is best characterized as being in VTOL flight mode. As illustrated, wing 18 is in flight orientation, generally perpendicular to fuselage 12. Mast assemblies 24a, 24b are each in a generally vertical orientation. Proprotor assemblies 26a, 26b are each in a radially extended orientation. Tail members 16a, 16b are in a dihedral orientation. Rotor blades 52a, 52b, 52c have been collectively operated to have a generally horizontal orientation. Rotor blades 52d, 52e, 52f have been collectively operated to have a generally horizontal orientation. In FIG. 4B, the conversion from VTOL flight mode to storage mode has begun. As illustrated, wing 18 remains in flight orientation, generally perpendicular to fuselage 12. Mast assemblies 24a, 24b have rotated approximately 30 degrees from the vertical orientation toward the horizontal orientation. Tail members 16a, 16b have begun to lower. Rotor blades 52a, 52b have begun to fold beamwise, while rotor blade 52c remains radially extended. Rotor blades 52d, 52e have begun to fold beamwise, while rotor blade 52f remains radially extended.

In FIG. 4C, the conversion from VTOL flight mode to storage mode continues. As illustrated, wing 18 remains in flight orientation, generally perpendicular to fuselage 12. Mast assemblies 24a, 24b have rotated approximately 45 degrees from the vertical orientation toward the horizontal orientation. Tail members 16a, 16b continue to lower. Rotor blades 52a, 52b continue to fold, while rotor blade 52c remains radially extended. Rotor blades 52d, 52e continue to fold, while rotor blade 52f remains radially extended. Proprotor assemblies 26a, 26b have counter rotated approximately 30 degrees such that rotor blades 52c, 52f are inboardly extended generally parallel with wing 18. Rotor blades 52a, 52d have cleared pylon assemblies 22a, 22b and are generally vertical having sufficient ground clearance to continue folding. In FIG. 4D, the conversion from VTOL flight mode to storage mode continues. As illustrated, wing 18 remains in flight orientation, generally perpendicular to fuselage 12. Mast assemblies 24a, 24b have rotated approximately 60 degrees from the vertical orientation toward the horizontal orientation. Tail members 16a, 16b continue to lower. Rotor blades 52a, 52b continue to fold, while rotor blade 52c remains radially extended until sufficient clearance with wing 18 is established allowing rotor blade 52c to begin beamwise folding. Rotor blades 52d, 52e continue to fold, while rotor blade 52f remains radially extended until sufficient clearance with wing 18 is established allowing rotor blade 52f to begin beamwise folding.

In FIG. 4E, the conversion from VTOL flight mode to storage mode continues. As illustrated, wing 18 has rotated approximately 45 degrees relative to fuselage 12. Mast assemblies 24a, 24b have rotated to the horizontal orientation. Tail members 16a, 16b are fully lowered to an anhedral orientation. Rotor blade 52a is in a stowed orientation beneath wing 18 and generally conforming with pylon assembly 22a. Rotor blades 52b, 52c are each in a stowed orientation above wing 18 and generally conforming with pylon assembly 22a. Rotor blade 52d is in a stowed orientation beneath wing 18 and generally conforming with pylon assembly 22b. Rotor blades 52e, 52f are each in a stowed orientation above wing 18 and generally conforming with pylon assembly 22b. In FIG. 4F, the conversion from VTOL flight mode to storage mode is complete. As illustrated, wing 18 is in stowed orientation, generally parallel to fuselage 12. Mast assemblies 24a, 24b are in the horizontal orientation. Tail members 16a, 16b are fully lowered to the anhedral orientation. Rotor blade 52a is in a stowed orientation beneath wing 18 and generally conforming with pylon assembly 22a. Rotor blades 52b, 52c are each in a stowed orientation above wing 18 and generally conforming with pylon assembly 22a. Rotor blade 52d is in a stowed orientation beneath wing 18 and generally conforming with pylon assembly 22b. Rotor blades 52e, 52f are each in a stowed orientation above wing 18 and generally conforming with pylon assembly 22b.

As illustrated, the storage mode of aircraft 10 depicted and described with reference to FIGS. 4A-4F significantly reduces the footprint of aircraft 10 as compared to the flight modes of aircraft 10. In the illustrated storage mode of aircraft 10, the stowed orientation of the rotor blades does not result in an undesirably large moment being placed on the drive systems. To return aircraft 10 from storage mode to VTOL flight mode, a reverse sequence may be followed to avoid contact between the various components of aircraft 10 with each other as well as to avoid contact between the various components of aircraft 10 and the surface on which aircraft 10 rests.

Figure 5A:
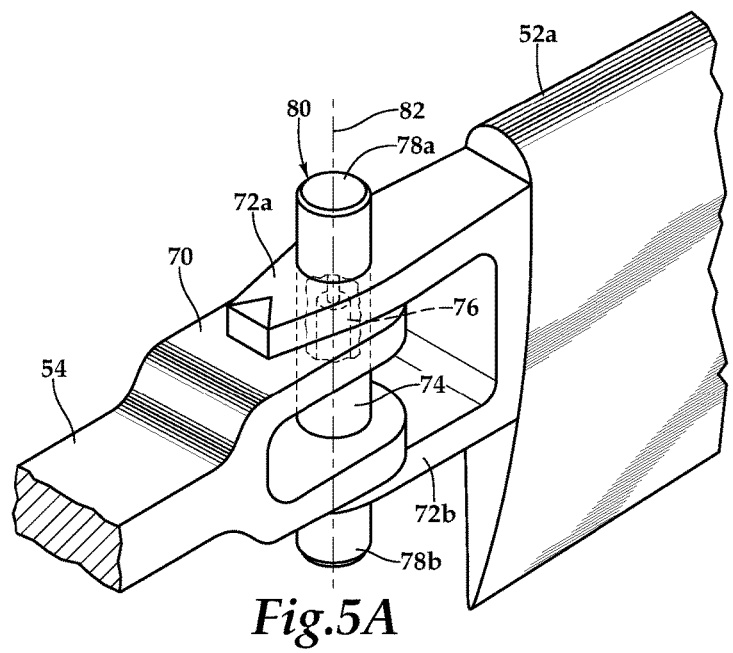
FIGS. 5A-5B are schematic illustrations of an actuation assembly operating a rotor blade between a radially extended orientation and a stowed orientation in accordance with embodiments of the present disclosure.
Figure 5B:
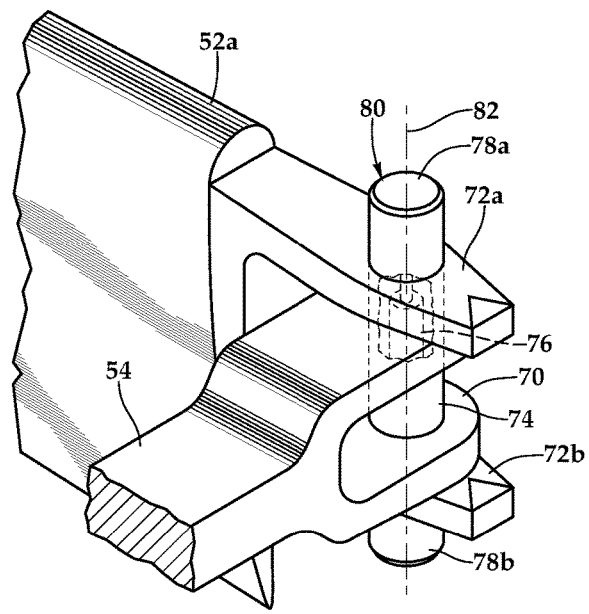

Referring to FIGS. 5A-5B of the drawings, the beamwise folding operation of a rotor blade is more fully described. The hingeable relationship of rotor blade 52a to rotor hub 54 is substantially similar to the hingeable relationship between each rotor blade and the respective rotor hub therefore, for sake of efficiency, certain features will be disclosed only with regard to rotor blade 52a and rotor hub 54. One having ordinary skill in the art, however, will fully appreciate an understanding of the hingeable relationship between other rotor blades and rotor hubs based upon the disclosure herein of rotor blade 52a and rotor hub 54. In the illustrated embodiment, rotor blade 52a is rotatably mounted to a grip assembly 70 of rotor hub 54 by a pair of spaced blade tangs 72a, 72b and a blade pivot pin 74, which extends therethrough. Mounted within pivot pin 74 is a drive motor 76 that has planetary gear reducers 78a, 78b mounted on each end thereof. Gear reducer 78a has an output that is coupled to blade tang 72a and gear reducer 78b has an output that is coupled to blade tang 72b such that rotor blade 52a moves responsive to operation of drive motor 76. As illustrated, drive motor 76 and gear reducers 78a, 78b form an actuation assembly depicted as rotary actuator 80 for rotating rotor blade 52a about axis of rotation 82. In one implementation, drive motor 76 reversibly operates to enable rotor blade 52a to be folded from the radially extended orientation to the stowed orientation and to be unfolded from the stowed orientation to the radially extended orientation. Preferably, rotor blade 52a may be locked in the radially extended orientation and in the stowed orientation by rotary actuator 80 and/or additional locking mechanisms (not shown).

Figure 6A:
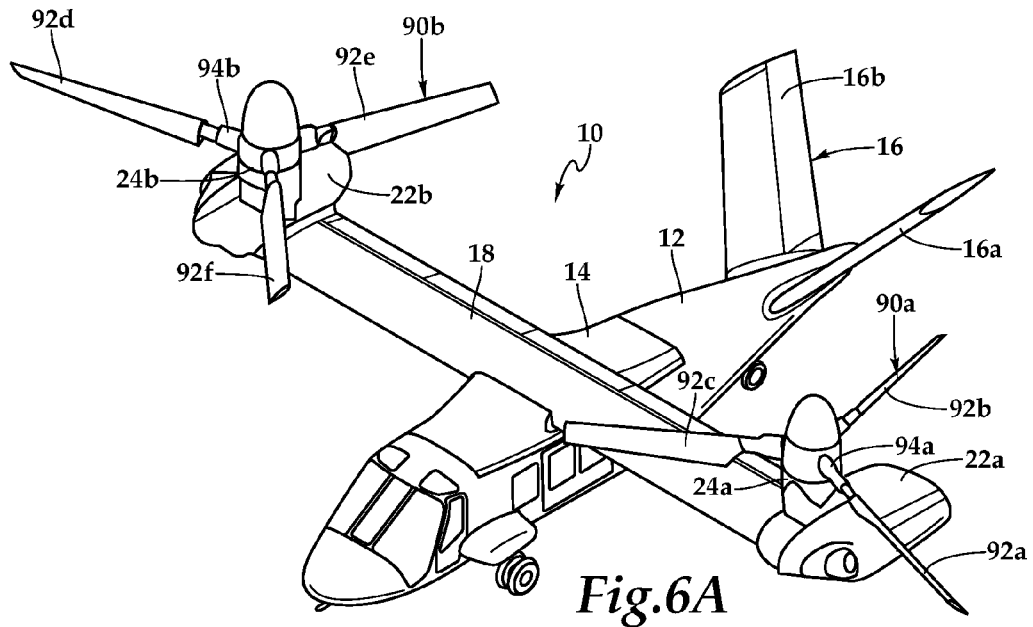
FIGS. 6A-6F are schematic illustrations of an exemplary tiltrotor aircraft transitioning between VTOL flight mode and storage mode in accordance with embodiments of the present disclosure.
Figure 6B:
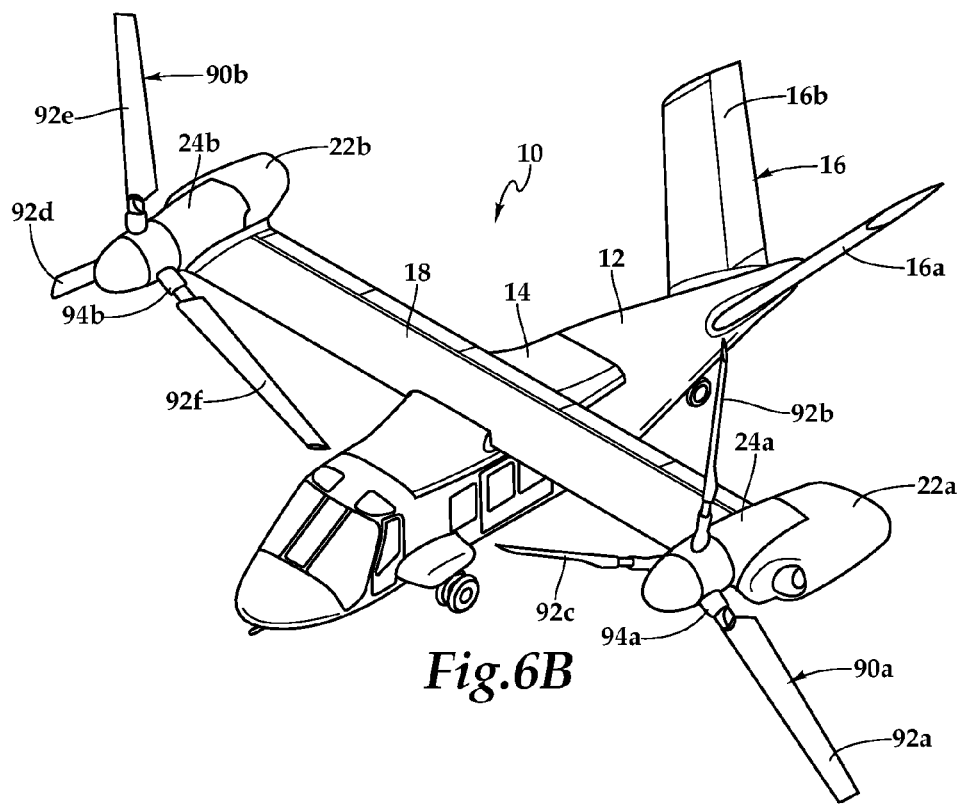
Figure 6C:
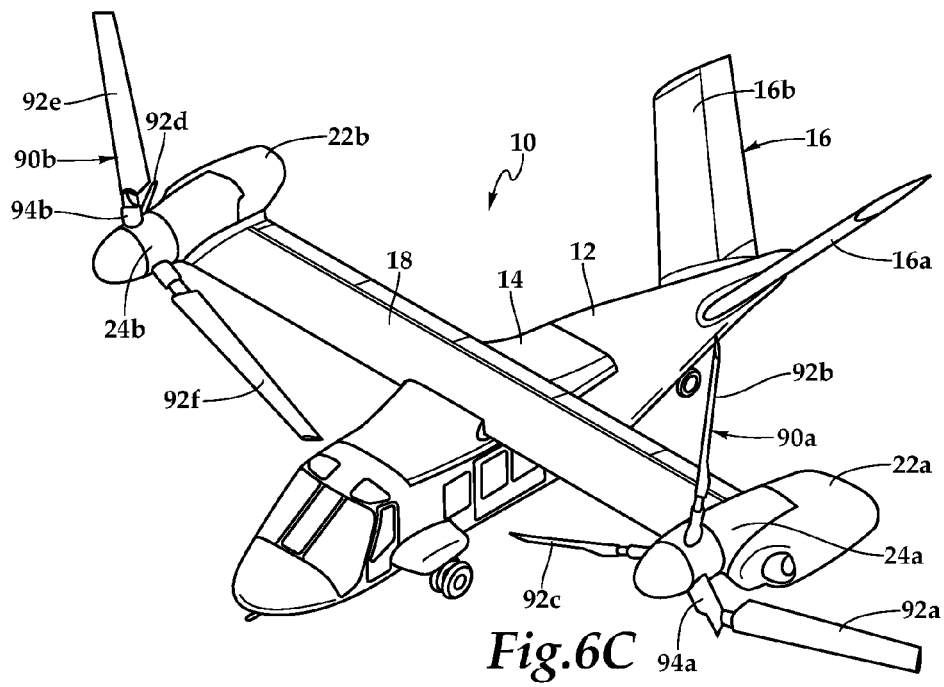
Figure 6D:
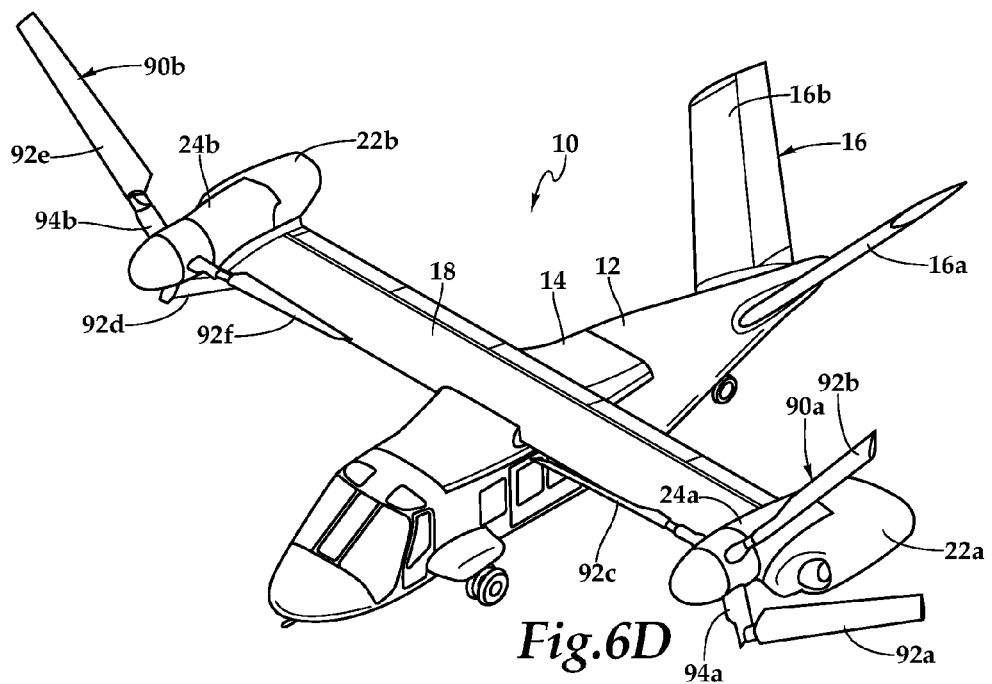
Figure 6E:
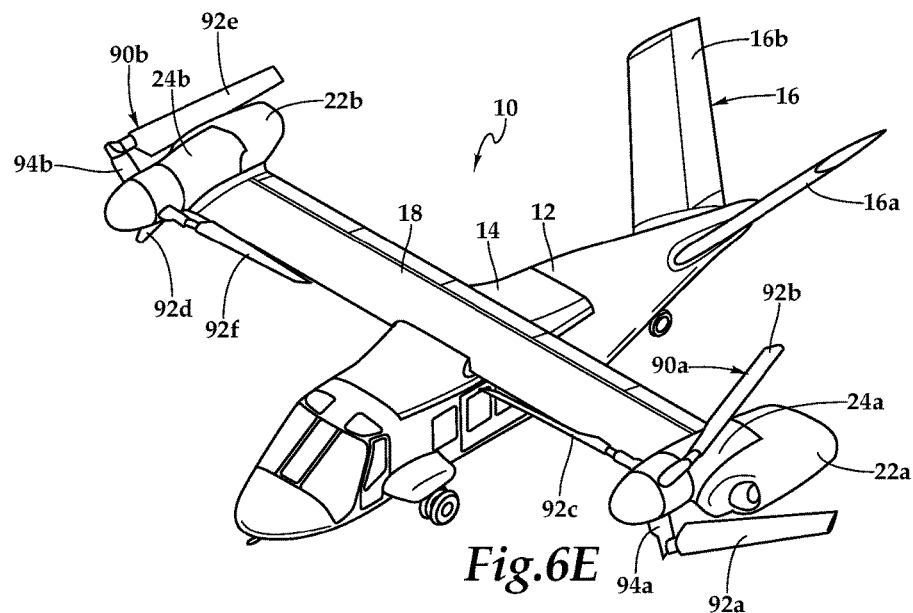
Figure 6F:
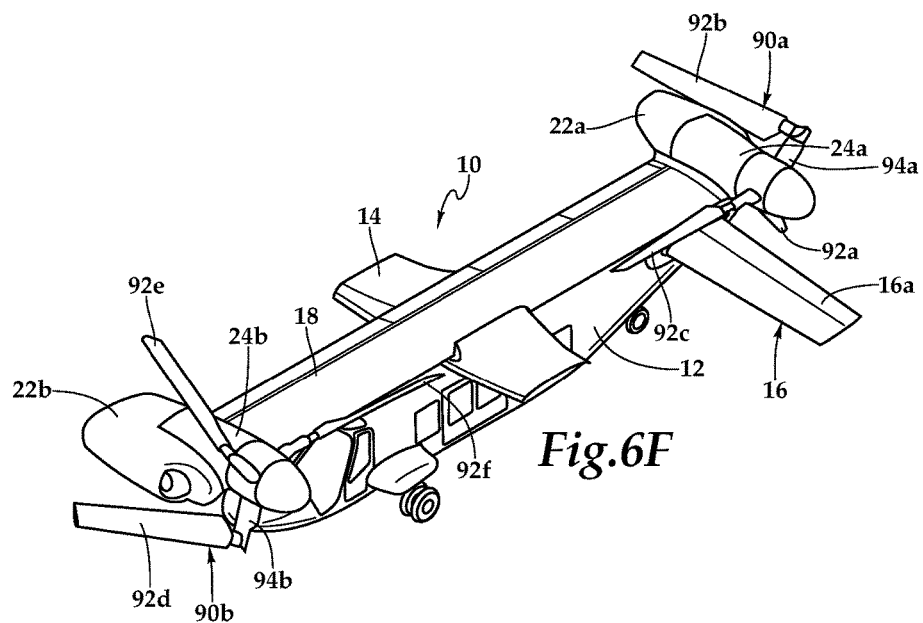

Referring next to FIGS. 6A-6F of the drawings, tiltrotor aircraft 10 is depicted in various states during a transition between VTOL flight mode and storage mode. Aircraft 10 has a VTOL flight mode, as best seen in FIG. 2B, a forward flight mode, as best seen in FIG. 2A, and a storage mode, as best seen in FIG. 6F. As discussed above, aircraft 10 includes fuselage 12 and wing 18 that is rotatably mounted to fuselage 12. Wing 18 is reversibly rotatable between a flight orientation that is generally perpendicular to fuselage 12, as best seen in FIG. 6A, and a stowed orientation that is generally parallel to fuselage 12, as best seen in FIG. 6F. Pylon assemblies 22a, 22b are positioned proximate the outboard ends of wing 18. Mast assemblies 24a, 24b are respectively rotatable relative to pylon assemblies 22a, 22b. Mast assemblies 24a, 24b are reversibly rotatable between a generally vertical orientation, as best seen in FIG. 6A, and a generally horizontal orientation, as best seen in FIGS. 6B-6F. Proprotor assemblies 90a, 90b are respectively rotatable relative to mast assemblies 24a, 24b. Proprotor assembly 90a includes rotor blades 92a, 92b, 92c and proprotor assembly 90b includes rotor blades 92d, 92e, 92f. Proprotor assemblies 90a, 90b each have a radially extended orientation, as best seen in FIG. 6A, and a stowed orientation, as best seen in FIG. 6F. More specifically in the stowed orientation, rotor blade 92a of proprotor assembly 90a is folded chordwise below wing 18 and generally conforming with pylon assembly 22a and rotor blade 92d of proprotor assembly 90b is folded chordwise below wing 18 and generally conforming with pylon assembly 22b. Rotor blade 92b of proprotor 90a is folded chordwise above wing 18 and generally conforming with pylon assembly 22a and rotor blade 92e of proprotor 90b is folded chordwise above wing 18 and generally conforming with pylon assembly 22b. Rotor blade 92c of proprotor 90a is inboardly extended generally parallel with wing 18 and rotor blade 92f of proprotor 90b is inboardly extended generally parallel with wing 18.

An example conversion operation of aircraft 10 from VTOL flight mode to storage mode will now be described, wherein folding of the rotor blades is preferably accomplished using a manual process. In FIG. 6A, aircraft 10 is best characterized as being in VTOL flight mode. As illustrated, wing 18 is in flight orientation, generally perpendicular to fuselage 12. Mast assemblies 24a, 24b are each in a generally vertical orientation. Proprotor assemblies 90a, 90b are each in a radially extended orientation. Tail members 16a, 16b are in a dihedral orientation. Rotor blades 92a, 92b, 92c have been collectively operated to have a generally vertical or feathered orientation. Rotor blades 92d, 92e, 92f have been collectively operated to have a generally vertical or feathered orientation. In FIG. 6B, the conversion from VTOL flight mode to storage mode has begun. As illustrated, wing 18 remains in flight orientation, generally perpendicular to fuselage 12. Mast assemblies 24a, 24b have rotated approximately 90 degrees to the horizontal orientation. Tail members 16a, 16b remains in the dihedral orientation. Rotor blades 92a, 92b, 92c remain radially extended. Rotor blades 92d, 92e, 92f remains radially extended. Proprotor assemblies 90a, 90b are positioned such that rotor blade 92b and rotor blade 92e each has a generally upwardly extending vertical orientation.

In FIG. 6C, the conversion from VTOL flight mode to storage mode continues. As illustrated, wing 18 remains in flight orientation, generally perpendicular to fuselage 12. Mast assemblies 24a, 24b are in the horizontal orientation. Tail members 16a, 16b remains in the dihedral orientation. Rotor blades 92a, 92d have been manually unlocked and partially folded to manually maintain ground clearance and clearance with pylon assemblies 22a, 22b. Rotor blades 92b, 92c, 92e, 92f remain radially extended. In FIG. 6D, the conversion from VTOL flight mode to storage mode continues. As illustrated, wing 18 remains in flight orientation, generally perpendicular to fuselage 12. Mast assemblies 24a, 24b are in the horizontal orientation. Tail members 16a, 16b remains in the dihedral orientation. Proprotor assemblies 90a, 90b have counter rotated approximately 30 degrees such that rotor blades 92c, 92f are inboardly extending generally parallel with wing 18. Rotor blades 92a, 92d are now clear of pylon assemblies 22a, 22b and are folded and locked in a stowed orientation. Rotor blades 92b, 92c, 92e, 92f remain radially extended.

In FIG. 6E, the conversion from VTOL flight mode to storage mode continues. As illustrated, wing 18 remains in flight orientation, generally perpendicular to fuselage 12. Mast assemblies 24a, 24b are in the horizontal orientation. Tail members 16a, 16b remains in the dihedral orientation. Rotor blade 92a is in a stowed orientation beneath wing 18 and generally conforming with pylon assembly 22a. Rotor blade 92d is in a stowed orientation beneath wing 18 and generally conforming with pylon assembly 22b. Rotor blade 92b has been manually unlocked, folded and locked in a stowed orientation above wing 18 and generally conforming with pylon assembly 22a. Rotor blade 92e has been manually unlocked, folded and locked in a stowed orientation above wing 18 and generally conforming with pylon assembly 22b. Rotor blades 92c, 92f are each inboardly extending generally parallel with wing 18. In FIG. 6F, the conversion from VTOL flight mode to storage mode is complete. As illustrated, wing 18 has been rotated approximately 90 degrees to a stowed orientation, generally parallel to fuselage 12. Mast assemblies 24a, 24b are in the horizontal orientation. Tail members 16a, 16b are fully lowered to an anhedral orientation. Rotor blade 92a is in a stowed orientation beneath wing 18 and generally conforming with pylon assembly 22a. Rotor blade 92d is in a stowed orientation beneath wing 18 and generally conforming with pylon assembly 22b. Rotor blade 92b is in a stowed orientation above wing 18 and generally conforming with pylon assembly 22a. Rotor blade 92e is in a stowed orientation above wing 18 and generally conforming with pylon assembly 22b. Rotor blades 92c, 92f are each inboardly extending generally parallel with wing 18 in a stowed orientation.

As illustrated, the storage mode of aircraft 10 depicted and described with reference to FIGS. 6A-6F significantly reduces the footprint of aircraft 10 as compared to the flight modes of aircraft 10. In the illustrated storage mode of aircraft 10, the stowed orientation of the rotor blades does not result in an undesirably large moment being placed on the drive systems. To return aircraft 10 from storage mode to VTOL flight mode, a reverse sequence may be followed to avoid contact between the various components of aircraft 10 with each other as well as to avoid contact between the various components of aircraft 10 and the surface on which aircraft 10 rests.

Figure 8:
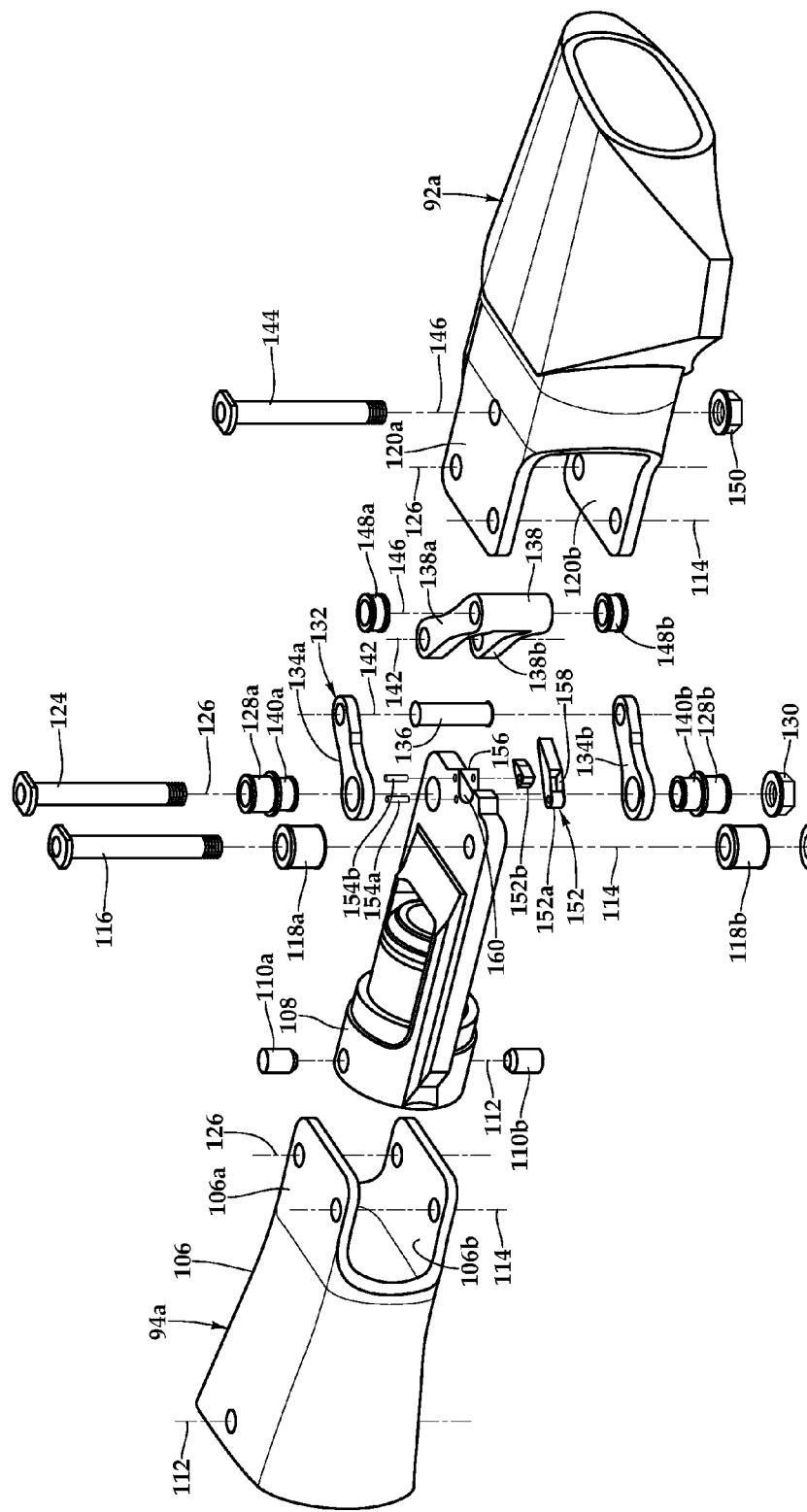
FIG. 8 is an exploded view of a rotor blade hinging and locking assembly for manually operating a rotor blade between a radially extended orientation and a stowed orientation in accordance with embodiments of the present disclosure.

Referring to FIGS. 7A-10D, the chordwise folding operation of a rotor blade is more fully described. The hingeable relationship of rotor blade 92a to rotor hub 94a is substantially similar to the hingeable relationship between each rotor blade and the respective rotor hub therefore, for sake of efficiency, certain features will be disclosed only with regard to rotor blade 92a and rotor hub 94a. One having ordinary skill in the art, however, will fully appreciate an understanding of the hingeable relationship between other rotor blades and rotor hubs based upon the disclosure herein of rotor blade 92a and rotor hub 94a. In the illustrated portions, rotor hub 94a includes a pitch horn 100, a leading fairing 102 and a trailing fairing 104, as best see in FIGS. 7A-7B. In addition, rotor hub 94a includes a grip assembly 106 and a harness 108 that are coupled together with connectors 110a, 110b along axis 112, as best seen in FIG. 8. It is noted that there are two instances of axis 112 labeled in FIG. 8, which symbolize that the instance of axis 112 extending through grip assembly 106 and the instance of axis 112 extending through harness 108 are a common axis when rotor hub 94a is fully assembled, wherein harness 108 is at least partially disposed within grip assembly 106. It is accordingly to be understood by those having ordinary skill in the art that this common axis convention will be used throughout FIG. 8.

Rotor blade 92a is rotatably coupled to grip assembly 106 and harness 108 about pivot pin 116 that extends along axis 114. In the illustrated embodiment, spacers 118a, 118b are sandwiched between grip assembly arms 106a, 106b and harness 108 along axis 114 and grip assembly arms 106a, 106b are sandwiched between blade tangs 120a, 120b such that pivot pin 116 passes through blade tang 120a, grip assembly arm 106a, spacer 118a, harness 108, spacer 118b, grip assembly arm 106b and blade tang 120b. A nut 122 is threadably coupled to pivot pin 116 to secure rotor blade 92a, grip assembly 106 and harness 108 together. Rotor blade 92a is secured in the radially extended orientation, as best seen in FIGS. 7A, 9A and 10A, by a lock assembly depicted as release pin 124 that extends along axis 126. In the illustrated embodiment, bushings 128a, 128b are sandwiched between grip assembly arms 106a, 106b and harness 108 along axis 126 and grip assembly arms 106a, 106b are sandwiched between blade tangs 120a, 120b such that release pin 124 passes through blade tang 120a, grip assembly arm 106a, bushing 128a, harness 108, bushing 128b, grip assembly arm 106b and blade tang 120b. A nut 130 is threadably coupled to release pin 124 to prevent rotor blade 92a from rotating relative to grip assembly 106 and harness 108 when rotor blade 92a is in the radially extended orientation for flight modes of aircraft 10.

A linkage assembly 132 is rotatably coupled to harness 108 and is rotatably coupled to rotor blade 92a. Linkage assembly 132 includes tow links 134a, 134b, a latch pin 136 and a drag link 138. In the illustrated embodiment, tow links 134a, 134b are rotatable about axis 126 as tow links 134a, 134b are respectively positioned on bearing surfaces 140a, 104b of bushings 128a, 128b. Tow links 134a, 134b rotatably coupled to drag link 138 via latch pin 136 along axis 142. More specifically, tow links 134a, 134b are sandwiched between drag link arms 138a, 138b with latch pin 136 extending therethrough. Drag link 138 is rotatably coupled to rotor blade 92a by linkage pin 144. In the illustrated embodiment, drag link 138 is sandwiched between spacers 148a, 148b and between blade tangs 120a, 120b such that linkage pin 144 passes through blade tang 120a, spacer 148a, drag link 138, spacer 148b and blade tang 120b. A nut 150 is threadably coupled to linkage pin 144 to secure rotor blade 92a and drag link 138 together. Rotor blade 92a is secured in the stowed orientation, as best seen in FIGS. 7B, 9D and 10D, by a lock assembly depicted as pawl assembly 152. Pawl assembly 152 includes a pawl member 152a that is coupled to harness 108 by pin 154a in receiving region 156 of harness 108. Pawl assembly 152 also includes a pawl member 152b that is coupled to harness 108 by pin 154b in receiving region 158 of pawl member 152a and receiving region 156 of harness 108.

The operation of chordwise folding and locking of rotor blade 92a will now be described. As best seen in FIGS. 9A and 10A, rotor blade 92a is secured to grip assembly 106 and harness 108 in the radially extended orientation by pivot pin 116 and release pin 124. This configuration of rotor blade 92a relative to grip assembly 106 and harness 108 is used for flight modes of tiltrotor aircraft 10. When it is desired to convert aircraft 10 to storage mode, rotor blade 92a is folded chordwise relative to grip assembly 106 and harness 108. As a first step, release pin 124 is removed from its connection with rotor blade 92a, grip assembly 106 and harness 108, which may be a manual process. In this configuration, rotor blade 92a is operable to rotate about pivot pin 116 relative to grip assembly 106 and harness 108, which may be a manual process. As best seen in FIGS. 9B and 10B, rotor blade 92a has rotated approximately 20 degrees relative to grip assembly 106 and harness 108. It is noted that linkage assembly 132 is moving from a contracted orientation to an extended orientation as rotor blade 92a rotates relative to grip assembly 106 and harness 108. The extension of linkage assembly 132 is a result of tow links 134a, 134b rotating about bearing surfaces 140a, 104b of bushings 128a, 128b, which remain coupled to harness 108 without the requirement of release pin 124 extending therethrough.

As best seen in FIGS. 9C and 10C, rotor blade 92a has rotated approximately 70 degrees relative to grip assembly 106 and harness 108 as linkage assembly 132 continues to be extended between rotor blade 92a and harness 108. In addition, latch pin 136 of linkage assembly 132 is approaching pawl assembly 152. As best seen in FIGS. 9D and 10D, rotor blade 92a has rotated approximately 90 degrees relative to grip assembly 106 and harness 108 as linkage assembly 132 continues to be extended between rotor blade 92a and harness 108. Rotor blade 92a is now in the stowed orientation. In addition, latch pin 136 of linkage assembly 132 has engaged pawl assembly 152, which now locks rotor blade 92a in the stowed orientation relative to the harness 108. More specifically, as latch pin 136 of linkage assembly 132 engages pawl assembly 152, latch pin 136 passes across pawl member 152b and enters a receiving region 160 of harness 108. Once latch pin 136 enters region 160, pawl member 152b prevent latch pin 136 from exiting region 160 and thus locks rotor blade 92a in the stowed orientation relative to the harness 108.

When it is desired to return aircraft 10 to flight mode, rotor blade 92a is unfolded chordwise relative to grip assembly 106 and harness 108. As a first step, pawl member 152a is depressed to eject latch pin 136 from region 160 of harness 108, which may be a manual process. In this configuration, rotor blade 92a is operable to rotate about pivot pin 116 relative to grip assembly 106 and harness 108 such that rotor blade 92a may be returned to the radially extended orientation, which may be a manual process. It is noted that linkage assembly 132 is moving from the extended orientation to the contracted orientation as rotor blade 92a rotates relative to grip assembly 106 and harness 108. Once rotor blade 92a is in the radially extended orientation, release pin 124 may be reinserted through blade tang 120a, grip assembly arm 106a, bushing 128a, harness 108, bushing 128b, grip assembly arm 106b and blade tang 120b. Nut 130 may now be threadably coupled to release pin 124 to secure rotor blade 92a in the radially extended orientation for flight modes of aircraft 10.

Figure 11A:
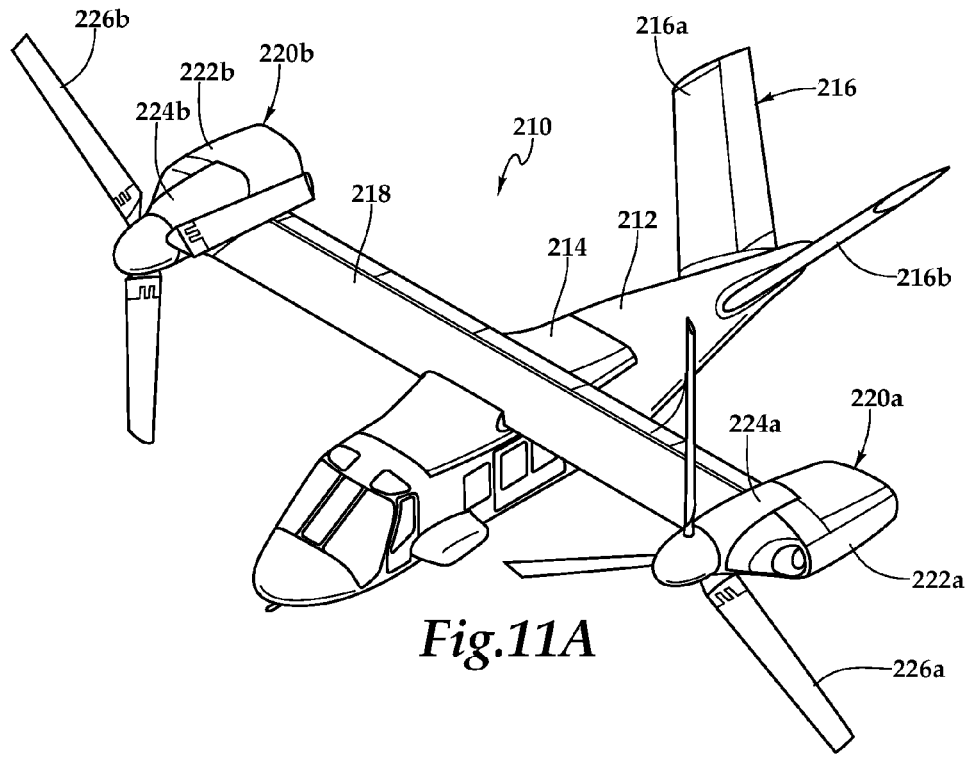
FIGS. 11A-11B are schematic illustrations of an exemplary tiltrotor aircraft in forward flight mode and in VTOL flight mode in accordance with embodiments of the present disclosure.
Figure 11B:
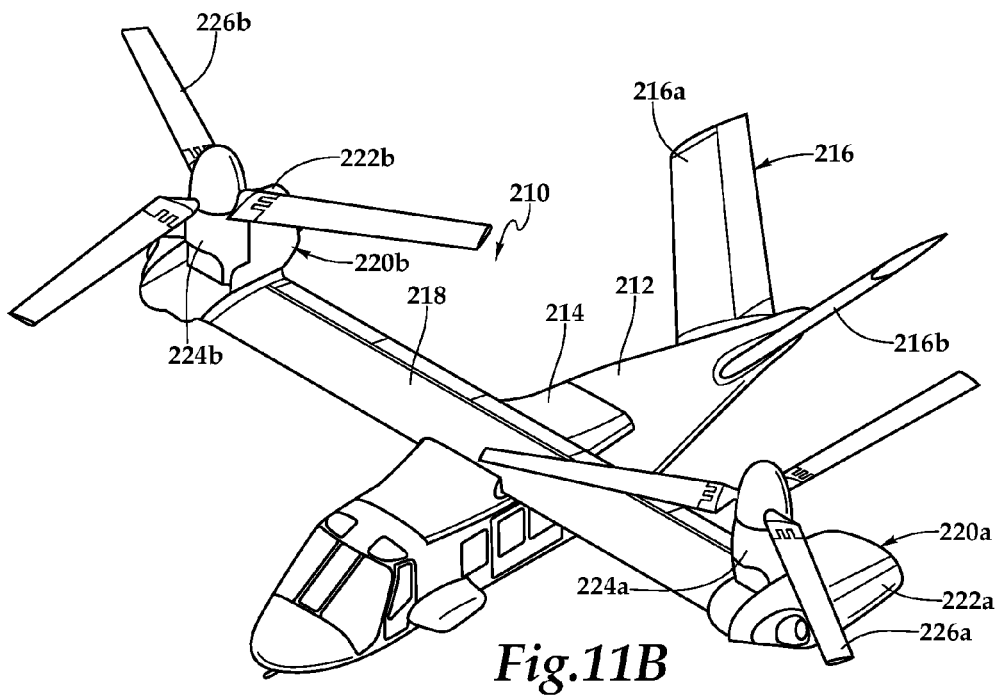

Referring to FIGS. 11A-11B in the drawings, a tiltrotor aircraft is schematically illustrated and generally designated 210. Aircraft 210 includes a fuselage 212, a wing mount assembly 214 that is rotatable relative to fuselage 212 and a tail assembly 216 including rotatably mounted tail members 216a, 216b having control surfaces operable for horizontal and/or vertical stabilization during forward flight. A wing member 218 is supported by wing mount assembly 214 and rotates with wing mount assembly 214 relative to fuselage 212 as discussed herein. Located at outboard ends of wing member 218 are propulsion assemblies 220a, 220b. Propulsion assembly 220a includes a nacelle depicted as fixed pylon 222a that houses an engine and transmission. In addition, propulsion assembly 220a includes a mast assembly 224a that is rotatable relative to fixed pylon 222a between a generally horizontal orientation, as best seen in FIG. 11A, a generally vertical orientation, as best seen in FIG. 11B. Propulsion assembly 220a also includes a proprotor assembly 226a that is rotatable relative to mast assembly 224a responsive to torque and rotational energy provided via a rotor hub assembly and drive system mechanically coupled to the engine and transmission. Likewise, propulsion assembly 220b includes a nacelle depicted as fixed pylon 222b that houses an engine and transmission, a mast assembly 224b that is rotatable relative to fixed pylon 222b and a proprotor assembly 226b that is rotatable relative to mast assembly 224b responsive to torque and rotational energy provided via a rotor hub assembly and drive system mechanically coupled to the engine and transmission.

FIG. 11A illustrates aircraft 210 in airplane or forward flight mode, in which proprotor assemblies 226a, 226b are rotating in a substantially vertical plane to provide a forward thrust enabling wing member 218 to provide a lifting force responsive to forward airspeed, such that aircraft 210 flies much like a conventional propeller driven aircraft. FIG. 11B illustrates aircraft 210 in helicopter or VTOL flight mode, in which proprotor assemblies 226a, 226b are rotating in a substantially horizontal plane to provide a lifting thrust, such that aircraft 210 flies much like a conventional helicopter. It should be appreciated that aircraft 210 can be operated such that proprotor assemblies 226a, 226b are selectively positioned between forward flight mode and VTOL flight mode, which can be referred to as a conversion flight mode.

In the illustrated embodiment, proprotor assemblies 226a, 226b each include three twisted rotor blades that are equally spaced apart circumferentially at approximately 120 degree intervals. It should be understood by those having ordinary skill in the art, however, that proprotor assemblies 226a, 226b of the present disclosure could have rotor blades with other designs and other configurations. During flight modes, proprotor assemblies 226a, 226b rotate in opposite directions to provide torque balancing to aircraft 210. For example, when viewed from the front of aircraft 210 in forward flight mode, proprotor assembly 226a rotates clockwise and proprotor assembly 226b rotates counterclockwise. In addition, proprotor assemblies 226a, 226b rotate 60 degrees out of phase with each other such that rotor blades of alternating proprotor assemblies 226a, 226b sequentially pass wing member 218 during all modes of operation of aircraft 210. Further, as discussed herein, proprotor assemblies 226a, 226b are mechanically coupled to a common interconnect drive shaft such that proprotor assemblies 226a, 226b have matched counter rotation wherein any rotation of one proprotor assembly 226a, 226b results in an equal counter rotation of the other of proprotor assembly 226a, 226b.

Figure 12A:
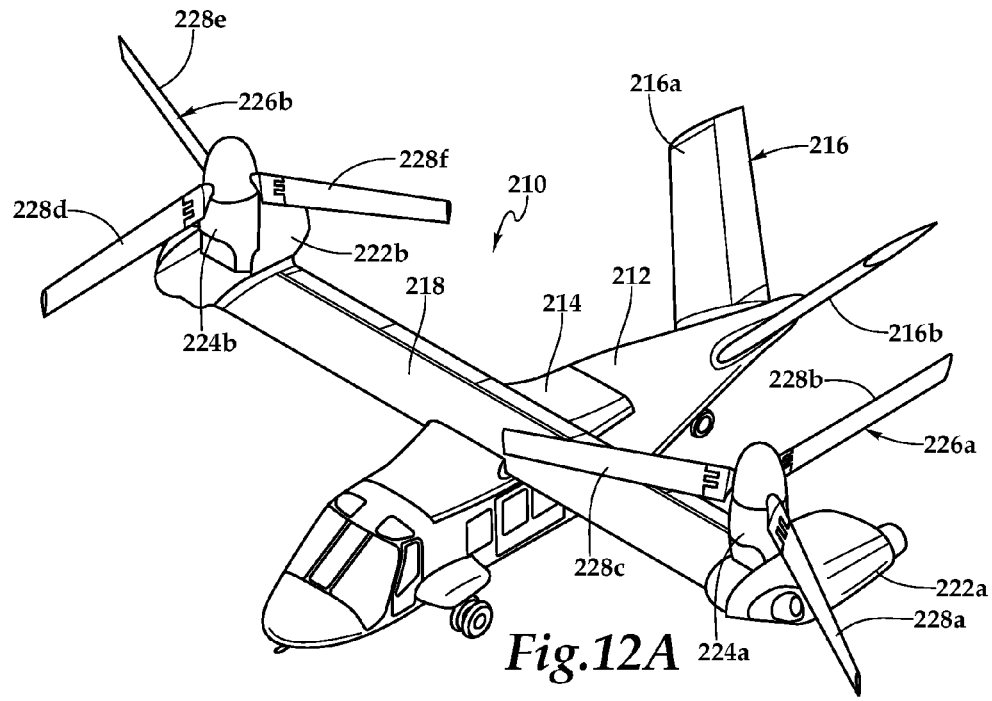
FIGS. 12A-12F are schematic illustrations of an exemplary tiltrotor aircraft transitioning between VTOL flight mode and storage mode in accordance with embodiments of the present disclosure.
Figure 12B:
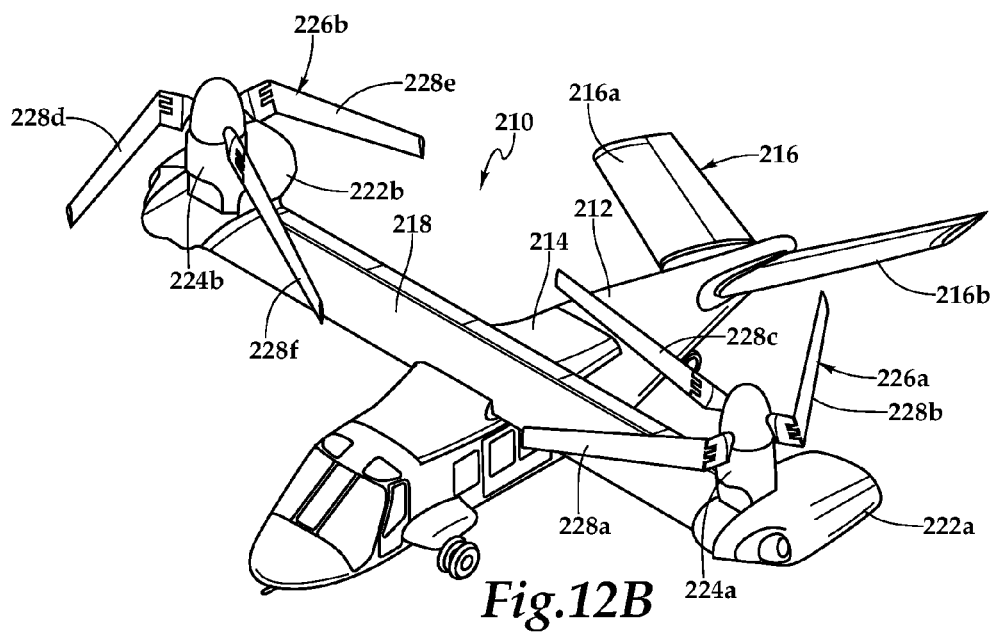
Figure 12C:
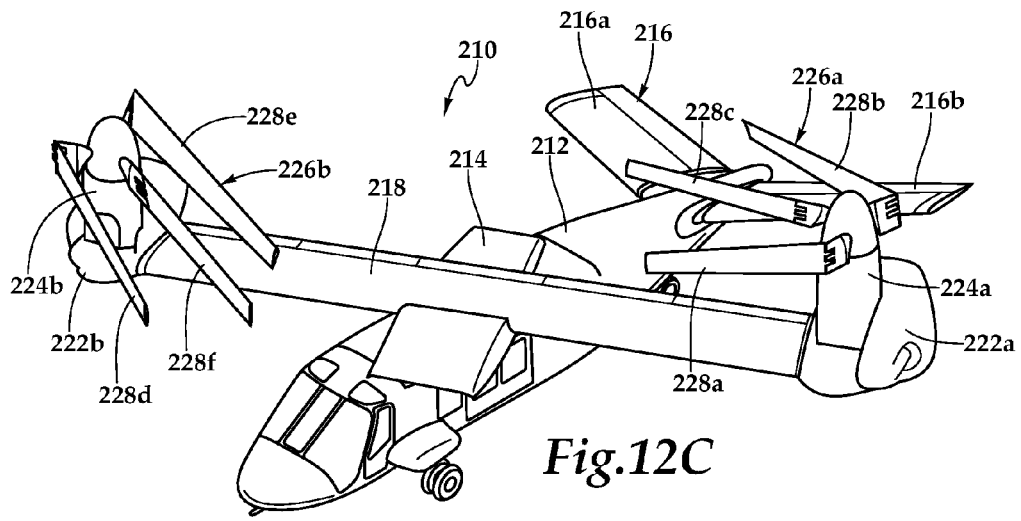
Figure 12D:
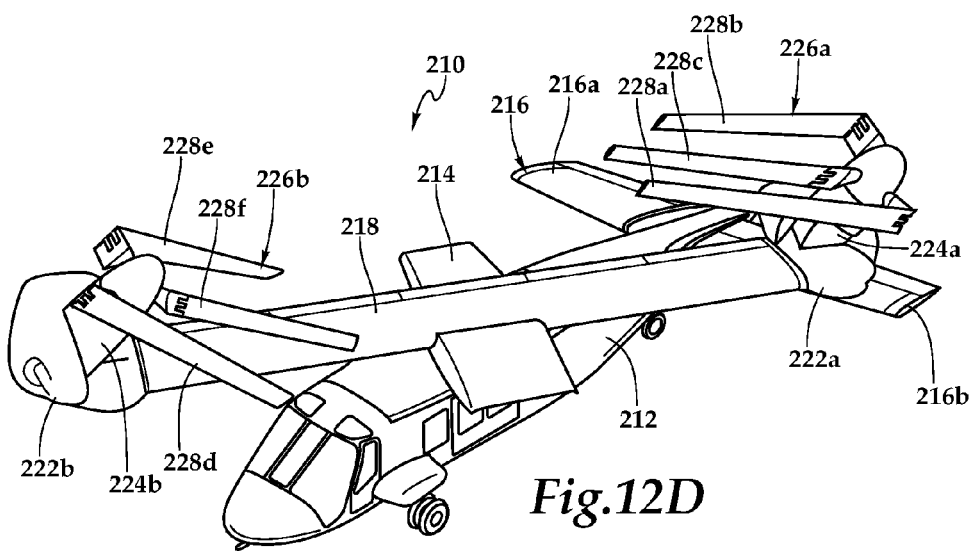
Figure 12E:
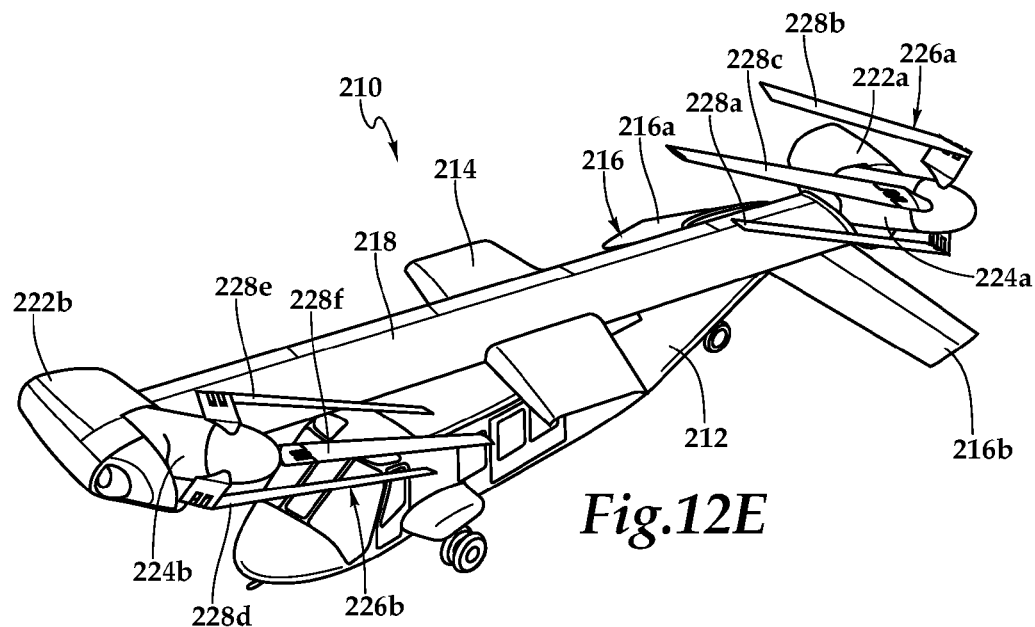
Figure 12F:
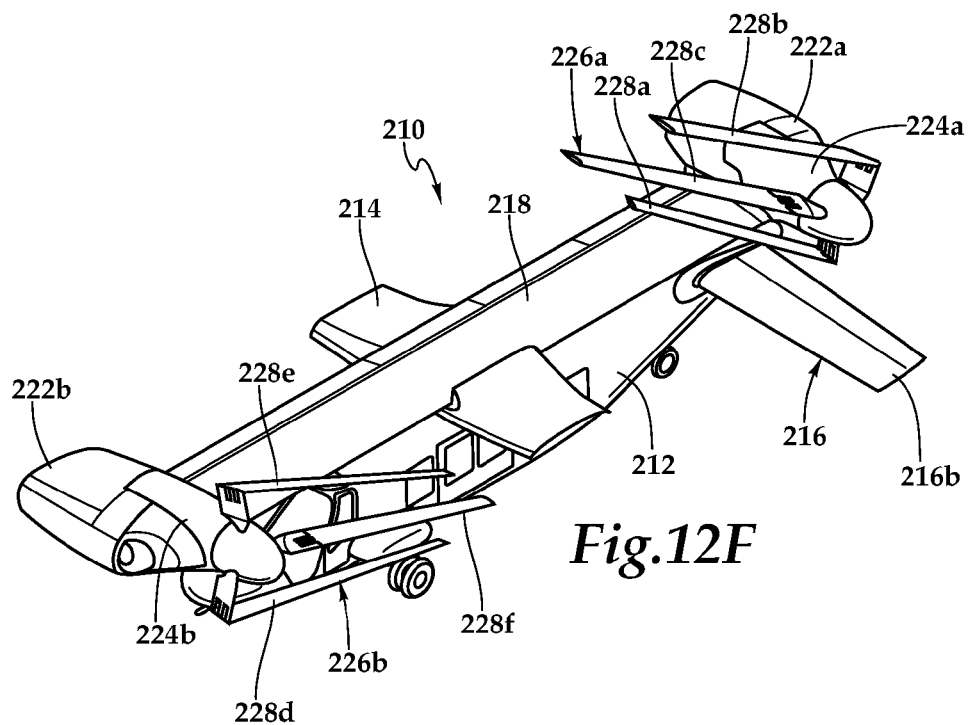

Referring next to FIGS. 12A-12F of the drawings, tiltrotor aircraft 210 is depicted in various states during a transition between VTOL flight mode and storage mode. Aircraft 210 has a VTOL flight mode, as best seen in FIG. 11B, a forward flight mode, as best seen in FIG. 11A, and a storage mode, as best seen in FIG. 12F. As discussed above, aircraft 210 includes fuselage 212 and wing 218 that is rotatably mounted to fuselage 212. Wing 218 is reversibly rotatable between a flight orientation that is generally perpendicular to fuselage 212, as best seen in FIG. 12A, and a stowed orientation that is generally parallel to fuselage 212, as best seen in FIG. 12F. Pylon assemblies 222a, 222b are positioned proximate the outboard ends of wing 218. Mast assemblies 224a, 224b are respectively rotatable relative to pylon assemblies 222a, 222b. Mast assemblies 224a, 224b are reversibly rotatable between a generally vertical orientation, as best seen in FIG. 12A, and a generally horizontal orientation, as best seen in FIG. 12F. Proprotor assemblies 226a, 226b are respectively rotatable relative to mast assemblies 224a, 224b. Proprotor assembly 226a includes rotor blades 228a, 228b, 228c and proprotor assembly 226b includes rotor blades 228d, 228e, 228f Proprotor assemblies 226a, 226b each have a radially extended orientation, as best seen in FIG. 12A, and a stowed orientation, as best seen in FIG. 12F. More specifically in the stowed orientation, rotor blades 228a, 228b of proprotor assembly 226a are folded beamwise to be generally parallel with rotor blade 228c and rotor blades 228d, 228e of proprotor assembly 226b are folded beamwise to be generally parallel with rotor blade 228f. In addition, rotor blades 228a, 228b, 228c of proprotor assembly 226a have an ascending orientation relative to wing 218 and rotor blades 228d, 228e, 228f of proprotor assembly 226b have a descending orientation relative to wing 218. In the illustrated embodiment, as proprotor assemblies 226a, 226b are 60 degrees out of phase, rotor blades 228a, 228b, 228c of proprotor assembly 226a ascend at an angle of approximately 30 degrees relative to wing 218 and rotor blades 228d, 228e, 228f of proprotor assembly 226b descend at an angle of approximately 30 degrees relative to wing 218.

An example conversion operation of aircraft 210 from VTOL flight mode to storage mode will now be described. In FIG. 12A, aircraft 210 is best characterized as being in VTOL flight mode. As illustrated, wing 218 is in flight orientation, generally perpendicular to fuselage 212. Mast assemblies 224a, 224b are each in a generally vertical orientation. Proprotor assemblies 226a, 226b are each in a radially extended orientation. Tail members 216a, 216b are in a dihedral orientation. Rotor blades 228a, 228b, 228c have been collectively operated to have a generally vertical orientation. Rotor blades 228d, 228e, 228f have been collectively operated to have a generally vertical orientation. In FIG. 12B, the conversion from VTOL flight mode to storage mode has begun. As illustrated, wing 218 remains in flight orientation, generally perpendicular to fuselage 212. Mast assemblies 224a, 224b remain in the vertical orientation. Tail members 216a, 216b have begun to lower. Rotor blades 228a, 228b have begun to fold beamwise, while rotor blade 228c remains radially extended. Rotor blades 228d, 228e have begun to fold beamwise, while rotor blade 228f remains radially extended. Proprotor assemblies 226a, 226b have counter rotated approximately 30 degrees.

In FIG. 12C, the conversion from VTOL flight mode to storage mode continues. As illustrated, wing 218 has rotated approximately 30 degrees relative to fuselage 212. Mast assemblies 224a, 224b remain in the vertical orientation. Tail members 216a, 216b continue to lower. Rotor blades 228a, 228b continue to fold, while rotor blade 228c remains radially extended. Rotor blades 228d, 228e continue to fold, while rotor blade 228f remains radially extended. In FIG. 12D, the conversion from VTOL flight mode to storage mode continues. As illustrated, wing 218 has rotated approximately 60 degrees relative to fuselage 212. Mast assemblies 224a, 224b have rotated approximately 30 degrees from the vertical orientation toward the horizontal orientation. Tail members 216a, 216b continue to lower. Rotor blades 228a, 228b continue to fold, while rotor blade 228c remains radially extended. Rotor blades 228d, 228e continue to fold, while rotor blade 228f remains radially extended.

In FIG. 12E, the conversion from VTOL flight mode to storage mode continues. As illustrated, wing 218 has rotated approximately 80 degrees relative to fuselage 212. Mast assemblies 224a, 224b have rotated approximately 60 degrees from the vertical orientation toward the horizontal orientation. Tail members 216a, 216b continue to lower. Rotor blades 228a, 228b are folded, while rotor blade 228c remains radially extended. Rotor blades 228d, 228e are folded, while rotor blade 228f remains radially extended. In FIG. 12F, the conversion from VTOL flight mode to storage mode is complete. As illustrated, wing 218 is in stowed orientation, generally parallel to fuselage 212. Mast assemblies 224a, 224b are in the horizontal orientation. Tail members 216a, 216b are fully lowered to the anhedral orientation. Rotor blades 228a, 228b are in the stowed orientation folded relative to rotor blade 228c, which remains radially extended. Rotor blades 228d, 228e are in the stowed orientation folded relative to rotor blade 228f, which remains radially extended. In addition, rotor blades 228a, 228b, 228c of proprotor assembly 226a have an ascending orientation relative to wing 218 and rotor blades 228d, 228e, 228f of proprotor assembly 226b have a descending orientation relative to wing 218.

As illustrated, the storage mode of aircraft 210 depicted and described with reference to FIGS. 12A-12F significantly reduces the footprint of aircraft 210 as compared to the flight modes of aircraft 210. In the illustrated storage mode of aircraft 210, the stowed orientation of the rotor blades does not result in an undesirably large moment being placed on the drive systems. To return aircraft 210 from storage mode to VTOL flight mode, a reverse sequence may be followed to avoid contact between the various components of aircraft 210 with each other as well as to avoid contact between the various components of aircraft 210 and the surface on which aircraft 210 rests.

Figure 13A:
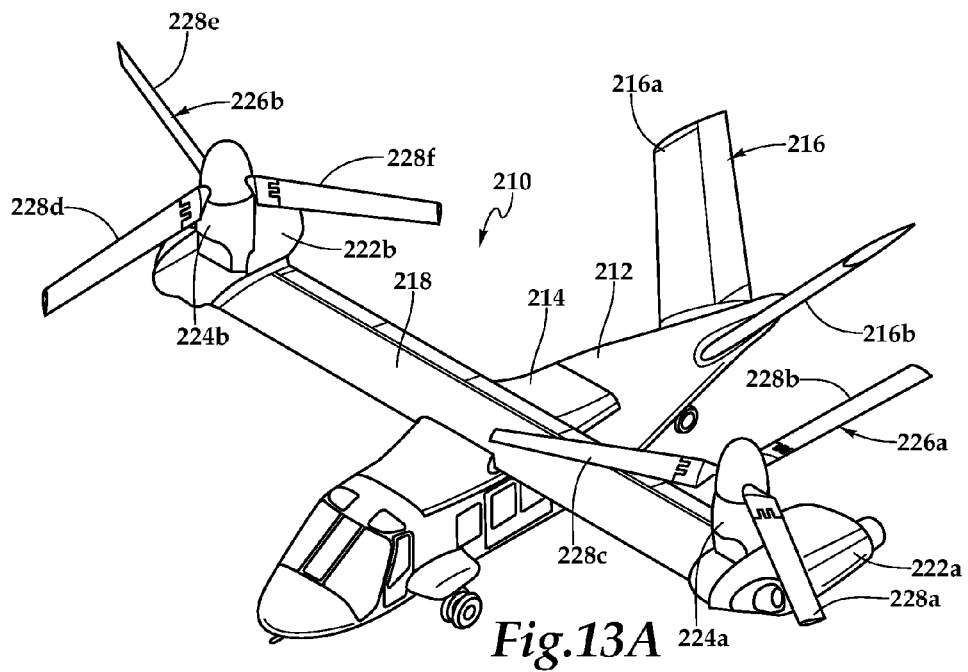

Referring next to FIGS. 13A-13F of the drawings, tiltrotor aircraft 210 is depicted in various states during a transition between VTOL flight mode and storage mode. Aircraft 210 has a VTOL flight mode, as best seen in FIG. 11B, a forward flight mode, as best seen in FIG. 11A, and a storage mode, as best seen in FIG. 13F. As discussed above, aircraft 210 includes fuselage 212 and wing 218 that is rotatably mounted to fuselage 212. Wing 218 is reversibly rotatable between a flight orientation that is generally perpendicular to fuselage 212, as best seen in FIG. 13A, and a stowed orientation that is generally parallel to fuselage 212, as best seen in FIG. 13F. Pylon assemblies 222a, 222b are positioned proximate the outboard ends of wing 218. Mast assemblies 224a, 224b are respectively rotatable relative to pylon assemblies 222a, 222b. Mast assemblies 224a, 224b are reversibly rotatable between a generally vertical orientation, as best seen in FIG. 13A, and a generally horizontal orientation, as best seen in FIG. 13F. Proprotor assemblies 226a, 226b are respectively rotatable relative to mast assemblies 224a, 224b. Proprotor assembly 226a includes rotor blades 228a, 228b, 228c and proprotor assembly 226b includes rotor blades 228d, 228e, 228f. Proprotor assemblies 226a, 226b each have a radially extended orientation, as best seen in FIG. 13A, and a stowed orientation, as best seen in FIG. 13F. More specifically in the stowed orientation, rotor blade 228a of proprotor assembly 226a is folded beamwise below wing 218 and generally conforming with pylon assembly 222a. Rotor blades 228b, 228c of proprotor assembly 226a are folded beamwise above wing 218 and generally conforming with pylon assembly 222a. Rotor blades 228d, 228e of proprotor assembly 226b are folded beamwise to be generally parallel with rotor blade 228f and rotor blades 228d, 228e, 228f of proprotor assembly 226b have a descending orientation relative to wing 218, wherein the descending orientation is an angle of approximately 30 degrees relative to wing 218.

Figure 13B:
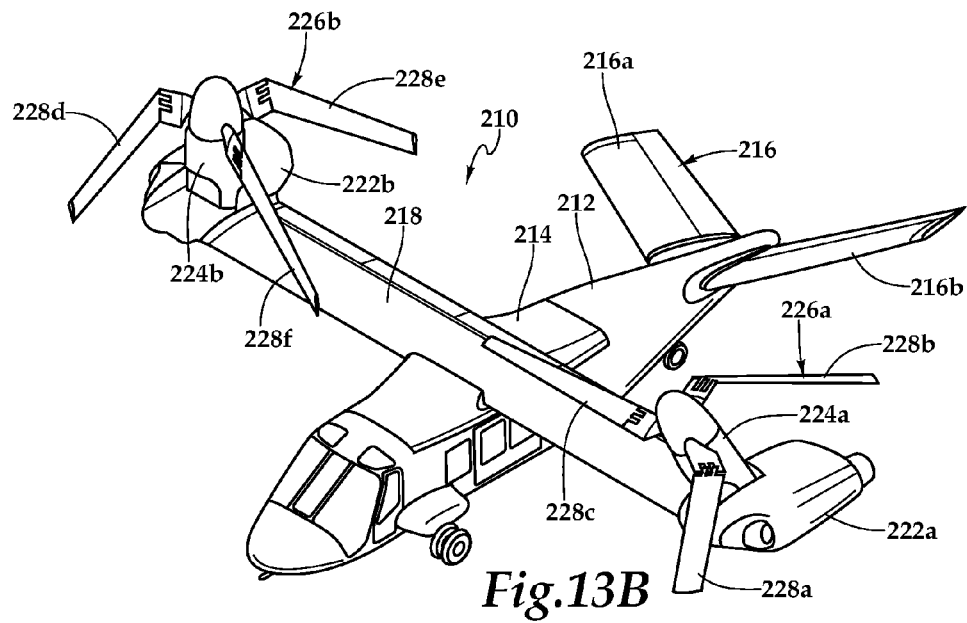

An example conversion operation of aircraft 210 from VTOL flight mode to storage mode will now be described. In FIG. 13A, aircraft 210 is best characterized as being in VTOL flight mode. As illustrated, wing 218 is in flight orientation, generally perpendicular to fuselage 212. Mast assemblies 224a, 224b are each in a generally vertical orientation. Proprotor assemblies 226a, 226b are each in a radially extended orientation. Tail members 216a, 216b are in a dihedral orientation. Rotor blades 228a, 228b, 228c have been collectively operated to have a generally horizontal orientation. Rotor blades 228d, 228e, 228f have been collectively operated to have a generally vertical orientation. In FIG. 13B, the conversion from VTOL flight mode to storage mode has begun. As illustrated, wing 218 remains in flight orientation, generally perpendicular to fuselage 212. Mast assembly 224a has rotated approximately 30 degrees from the vertical orientation toward the horizontal orientation. Mast assembly 224b remains in the vertical orientation. Tail members 216a, 216b have begun to lower. Rotor blades 228a, 228b have begun to fold beamwise, while rotor blade 228c remains radially extended. Rotor blades 228d, 228e have begun to fold beamwise, while rotor blade 228f remains radially extended. Proprotor assemblies 226a, 226b have counter rotated approximately 30 degrees.

Figure 13C:
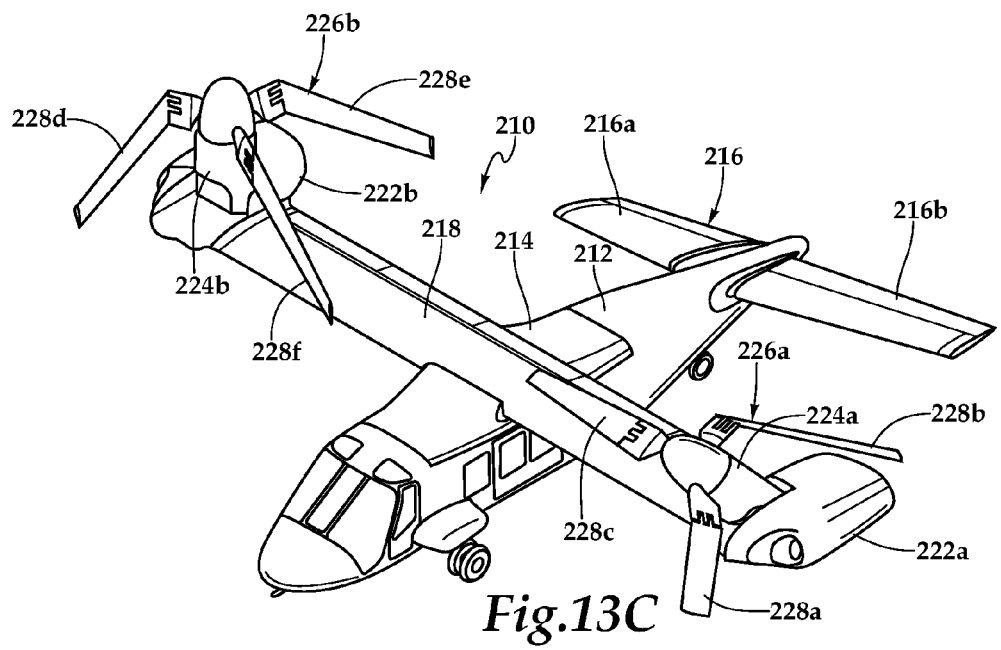
Figure 13D:
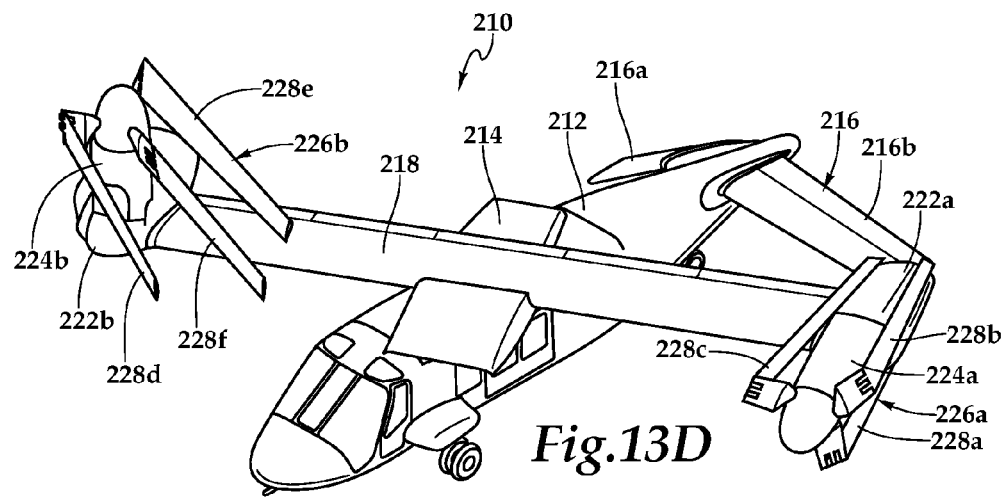

In FIG. 13C, the conversion from VTOL flight mode to storage mode continues. As illustrated, wing 218 remains in flight orientation, generally perpendicular to fuselage 212. Mast assembly 224a has rotated approximately 60 degrees from the vertical orientation toward the horizontal orientation. Mast assembly 224b remains in the vertical orientation. Tail members 216a, 216b continue to lower. Rotor blades 228a, 228b continue to fold beamwise, while rotor blade 228c remains radially extended until sufficient clearance with wing 218 is established allowing rotor blade 228c to begin beamwise folding. Rotor blade 228a has cleared pylon assembly 222a and has sufficient ground clearance to continue folding. Rotor blades 228d, 228e continue to fold beamwise, while rotor blade 228f remains radially extended. In FIG. 13D, the conversion from VTOL flight mode to storage mode continues. As illustrated, wing 218 has rotated approximately 45 degrees relative to fuselage 212. Mast assembly 224a has rotated approximately 90 degrees from the vertical orientation toward the horizontal orientation. Mast assembly 224b remains in the vertical orientation. Tail members 216a, 216b are fully lowered. Rotor blade 228a is in a stowed orientation beneath wing 218 and generally conforming with pylon assembly 222a. Rotor blades 228b, 228c are each in a stowed orientation above wing 218 and generally conforming with pylon assembly 222a. Rotor blades 228d, 228e continue to fold, while rotor blade 228f remains radially extended.

In FIG. 13E, the conversion from VTOL flight mode to storage mode continues. As illustrated, wing 218 has rotated approximately 80 degrees relative to fuselage 212. Mast assembly 224a is in the horizontal orientation. Mast assembly 224b has rotated approximately 60 degrees from the vertical orientation toward the horizontal orientation. Tail members 216a, 216b are fully lowered. Rotor blade 228a is in a stowed orientation beneath wing 218 and generally conforming with pylon assembly 222a. Rotor blades 228b, 228c are each in a stowed orientation above wing 218 and generally conforming with pylon assembly 222a. Rotor blades 228d, 228e are folded, while rotor blade 228f remains radially extended. In FIG. 13F, the conversion from VTOL flight mode to storage mode is complete. As illustrated, wing 218 is in stowed orientation, generally parallel to fuselage 212. Mast assemblies 224a, 224b are in the horizontal orientation. Tail members 216a, 216b are fully lowered to the anhedral orientation. Rotor blade 228a is in a stowed orientation beneath wing 218 and generally conforming with pylon assembly 222a. Rotor blades 228b, 228c are each in a stowed orientation above wing 218 and generally conforming with pylon assembly 222a. Rotor blades 228d, 228e are in the stowed orientation folded relative to rotor blade 228f, which remains radially extended. In addition, rotor blades 228d, 228e, 228f of proprotor assembly 226b have a descending orientation relative to wing 218.

As illustrated, the storage mode of aircraft 210 depicted and described with reference to FIGS. 13A-13F significantly reduces the footprint of aircraft 210 as compared to the flight modes of aircraft 210. In the illustrated storage mode of aircraft 210, the stowed orientation of the rotor blades does not result in an undesirably large moment being placed on the drive systems. To return aircraft 210 from storage mode to VTOL flight mode, a reverse sequence may be followed to avoid contact between the various components of aircraft 210 with each other as well as to avoid contact between the various components of aircraft 210 and the surface on which aircraft 210 rests.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tiltrotor aircraft having a VTOL flight mode, a forward flight mode and a storage mode, the aircraft comprising:
   a fuselage;
   a wing rotatably mounted to the fuselage and having first and second outboard ends, the wing reversibly rotatable between a flight orientation, substantially perpendicular to the fuselage, in the flight modes, and a stowed orientation, substantially parallel to the fuselage, in the storage mode;
   first and second pylon assemblies respectively positioned proximate the first and second outboard ends of the wing;
   first and second mast assemblies respectively rotatable relative to the first and second pylon assemblies, the first and second mast assemblies reversibly rotatable between a substantially vertical orientation, in the VTOL flight mode, and a substantially horizontal orientation, in the forward flight mode and the storage mode; and
   first and second proprotor assemblies respectively rotatable relative to the first and second mast assemblies, the first and second proprotor assemblies each including first, second and third rotor blades and each having a radially extended orientation, in the flight modes, and a stowed orientation, in the storage mode, wherein the first and second rotor blades of each proprotor assembly are bolded beamwise to be substantially parallel with the respective third rotor blade, the rotor blades of the first proprotor assembly have an ascending orientation relative to the wing and the rotor blades of the second proprotor assembly have a descending orientation relative to the wing, wherein the first proprotor assembly rotates approximately 60 degrees out of phase with the second proprotor assembly.

2. The aircraft as recited in claim 1 further comprising first and second tail members mounted to the fuselage, the first and second tail members reversibly rotatable between a dihedral orientation, in the flight modes, and an anhedral orientation, in the storage mode.

3. The aircraft as recited in claim 1 wherein, in the storage mode, the first proprotor assembly is positioned aft of the second proprotor assembly.

4. The aircraft as recited in claim 1 wherein, in the storage mode, the ascending orientation of the rotor blades of the first proprotor assembly relative to the wing further comprises an angle of approximately 30 degrees and the descending orientation of the rotor blades of the second proprotor assembly relative to the wing further comprises an angle of approximately 30 degrees.

5. The aircraft as recited in claim 1 wherein the first and second proprotor assemblies have matched counter rotation.

6. The aircraft as recited in claim 1 wherein each of the first and second proprotor assemblies further comprises a rotor hub and wherein the rotor blades of each proprotor assembly are respectively hingeably coupled to the rotor hub.

7. The aircraft as recited in claim 1 wherein each of the first and second proprotor assemblies further comprises a plurality of rotor blade actuators operable to reversibly rotate the respective rotor blades between the radially extended orientation and the stowed orientation.

8. The aircraft as recited in claim 1 wherein each of the first and second mast assemblies further comprises a pitch control assembly operable to control a collective pitch of the rotor blades of the respective proprotor assembly.

9. The aircraft as recited in claim 1 wherein each of the first and second pylon assemblies further comprises a conversion actuator operable to reversibly rotate the respective mast assembly between the substantially vertical orientation and the substantially horizontal orientation.

10. A method of converting a tiltrotor aircraft from a VTOL flight mode to a storage mode, the aircraft including a fuselage, a wing rotatably mounted to the fuselage and having first and second outboard ends, first and second pylon assemblies respectively positioned proximate the first and second outboard ends of the wing, first and second mast assemblies respectively rotatable relative to the first and second pylon assemblies and first and second proprotor assemblies respectively rotatable relative to the first and second mast assemblies, the method comprising:
  folding first and second rotor blades of each proprotor assembly beamwise to be substantially parallel with a respective third rotor blade;
  rotating the wing from a flight orientation, substantially perpendicular to the fuselage, to a stowed orientation, substantially parallel to the fuselage;
  rotating the first and second mast assemblies from a substantially vertical orientation to a substantially horizontal orientation; and
  counter rotating the first and second proprotor assemblies such that the rotor blades of the first proprotor assembly have an ascending orientation relative to the wing and the rotor blades of the second proprotor assembly have a descending orientation relative to the wing, wherein the first proprotor assembly rotates approximately 60 degrees out of phase with the second proprotor assembly.

11. The method as recited in claim 10 further comprising rotating first and second tail members mounted to the fuselage from a dihedral orientation to an anhedral orientation.

12. The method as recited in claim 10 further comprising collectively adjusting a pitch of the rotor blades of each proprotor assembly before the folding step.

13. The method as recited in claim 10 further comprising feathering the rotor blades of each proprotor assembly before the folding step.

14. The method as recited in claim 10 wherein the step of counter rotating the first and second proprotor assemblies further comprises counter rotating the first and second proprotor assemblies such that the ascending orientation of the rotor blades of the first proprotor assembly relative to the wing further comprises an angle of approximately 30 degrees and the descending orientation of the rotor blades of the second proprotor assembly relative to the wing further comprises an angle of approximately 30 degrees.

15. The method as recited in claim 10 wherein rotating the wing from the tight orientation, substantially perpendicular to the fuselage, to the stowed orientation, substantially parallel to the fuselage further comprises positioning the first proprotor assembly aft of the second proprotor assembly.

16. The method as recited in claim 10 wherein at least a portion of the step of folding the first and second rotor blades of each proprotor assembly beamwise to be substantially parallel with the respective third rotor blade occurs while the first and second proprotor assemblies are being counter rotated.

17. The method as recited in claim 10 wherein at least a portion of the step of rotating the first and second mast assemblies from the substantially vertical orientation to the substantially horizontal orientation occurs while the wing is being rotated from the flight orientation, substantially perpendicular to the fuselage, to the stowed orientation, substantially parallel to the fuselage.

18. The method as recited in claim 10 wherein at least a portion of the step of folding the first and second rotor blades of each proprotor assembly beamwise to be substantially parallel with the respective third rotor blade occurs while the wing is being rotated from the flight orientation, substantially perpendicular to the fuselage, to the stowed orientation, substantially parallel to the fuselage.

19. The method as recited in claim 10 wherein folding the first and second rotor blades of each proprotor assembly beamwise to be substantially parallel with the respective third rotor blade occurs before rotating the first and second mast assemblies from the substantially vertical orientation to the substantially horizontal orientation.

* * * * *